United States Patent
Chang et al.

(10) Patent No.: US 11,350,082 B2
(45) Date of Patent: May 31, 2022

(54) DEVICE AND METHOD FOR CODING VIDEO DATA IN MULTIPLE REFERENCE LINE PREDICTION

(71) Applicant: FG Innovation Company Limited, Tuen Mun (HK)

(72) Inventors: Yao-Jen Chang, Hsinchu (TW); Hui-Yu Jiang, Hsinchu (TW); Tsung-Hua Li, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 3 days.

(21) Appl. No.: 16/362,730

(22) Filed: Mar. 25, 2019

(65) Prior Publication Data
US 2019/0306494 A1   Oct. 3, 2019

Related U.S. Application Data

(60) Provisional application No. 62/649,135, filed on Mar. 28, 2018.

(51) Int. Cl.
*H04N 19/105*   (2014.01)
*H04N 19/176*   (2014.01)
*H04N 19/159*   (2014.01)

(52) U.S. Cl.
CPC ......... *H04N 19/105* (2014.11); *H04N 19/159* (2014.11); *H04N 19/176* (2014.11)

(58) Field of Classification Search
CPC ... H04N 19/105; H04N 19/159; H04N 19/176
See application file for complete search history.

(56) References Cited

U.S. PATENT DOCUMENTS

| 2017/0272745 A1 | 9/2017 | Liu et al. |
| 2017/0339404 A1 | 11/2017 | Panusopone et al. |

(Continued)

FOREIGN PATENT DOCUMENTS

| WO | 2017176030 A1 | 10/2017 |
| WO | 2017/190288 A1 | 11/2017 |

(Continued)

OTHER PUBLICATIONS

Jiahao Li, "Multiple line-based intra prediction", JVET-C0071, Joint Video Exploration Team (JVET) of ITU-T SG 16 WP 3 and ISO/IEC JTC 1/SC 29/WG 11, 3rd Meeting: Geneva, CH, May 26-Jun. 1, 2016.

(Continued)

*Primary Examiner* — Hesham K Abouzahra
(74) *Attorney, Agent, or Firm* — ScienBiziP, P.C.

(57) ABSTRACT

A method of decoding a bitstream by an electronic device is provided. A block unit having an intra prediction mode is determined from an image frame according to the bitstream. The intra prediction mode is determined based on a first one of a plurality of mode indices, when a reference line index (Refidx) is different from a first predefined value. The intra prediction mode is determined based on the first mode index, when the Refidx is equal to the first predefined value and a most probable mode (mpm) flag is equal to a second predefined value. The intra prediction mode is determined based on a second one of the mode indices, when the Refidx is equal to the first predefined value and the mpm flag is different from the second predefined value. Then, the block unit of the image frame is reconstructed based on the intra prediction mode.

16 Claims, 10 Drawing Sheets

(56) References Cited

U.S. PATENT DOCUMENTS

| | | | |
|---|---|---|---|
| 2017/0347103 A1* | 11/2017 | Yu | H04N 19/1883 |
| 2017/0353730 A1 | 12/2017 | Liu et al. | |
| 2017/0359595 A1 | 12/2017 | Zhang et al. | |
| 2018/0332284 A1* | 11/2018 | Liu | H04N 19/70 |
| 2021/0021832 A1* | 1/2021 | Lee | H04N 19/189 |

FOREIGN PATENT DOCUMENTS

| | | |
|---|---|---|
| WO | 2017196957 A1 | 11/2017 |
| WO | 2017204427 A1 | 11/2017 |

OTHER PUBLICATIONS

Liang Zhao et al., "CE3-related: MPM based multi-line intra prediction scheme", JVET-K0482, Joint Video Exploration Team (JVET) of ITU-T SG 16 WP 3 and ISO/IEC JTC 1/SC 29/WG 11, 11th Meeting: Ljubljana, SI, Jul. 10-18, 2018.

Hui-Yu Jiang, "CE3-related: Advanced MPM based on intra reference line selection scheme", JVET-K0175, Joint Video Experts Team (JVET) of ITU-T SG 16 WP 3 and ISO/IEC JTC 1/SC 29/WG 11, 11th Meeting: Ljubljana, SI, Jul. 10-18, 2018.

* cited by examiner

DEVICE AND METHOD FOR CODING VIDEO DATA IN MULTIPLE REFERENCE LINE PREDICTION

CROSS-REFERENCE TO RELATED APPLICATION(S)

The present application claims the benefit of and priority to a provisional U.S. Patent Application Ser. No. 62/649,135 filed on Mar. 28, 2018, entitled "Reference Line Setting Method for Intra Prediction". The disclosure of the US73435 application is hereby incorporated fully by reference into the present application.

FIELD

The present disclosure generally relates to video coding, and more particularly, to techniques for mode selection in multiple reference line prediction.

BACKGROUND

The intra prediction is a coding tool for video coding. In a conventional video coding method, an encoder and a decoder only use the previously reconstructed pixels in a closest pixel line adjacent to a coding block to generate reference pixels and predictors for predicting or reconstructing the coding block along an orientation.

However, the closest pixel line may include a texture of a first object different from a second object in the coding block, and/or signal noise. Thus, the encoder can exploit the closest pixel line and other adjacent pixel lines near the closest pixel line to generate the reference pixels and the predictors. When the encoder exploits more than one pixel line to generate the reference pixels and the predictors, the encoder needs to signal a flag indicating the selected reference lines into a bitstream. As a result, it is necessary for the decoder to parse the flag from the bitstream and determine, based on the flag, which of the pixel lines are selected for the coding block.

In addition, the number of a plurality of predicted results may be too much for the encoder to quickly select an appropriate predicted result, when the encoder selects different reference lines to predict the coding block based on a plurality of intra modes included in a predefined mode list. Thus, the encoder may need different mode lists for different reference lines.

SUMMARY

The present disclosure is directed to a device and method for coding video data based on multiple-reference lines.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
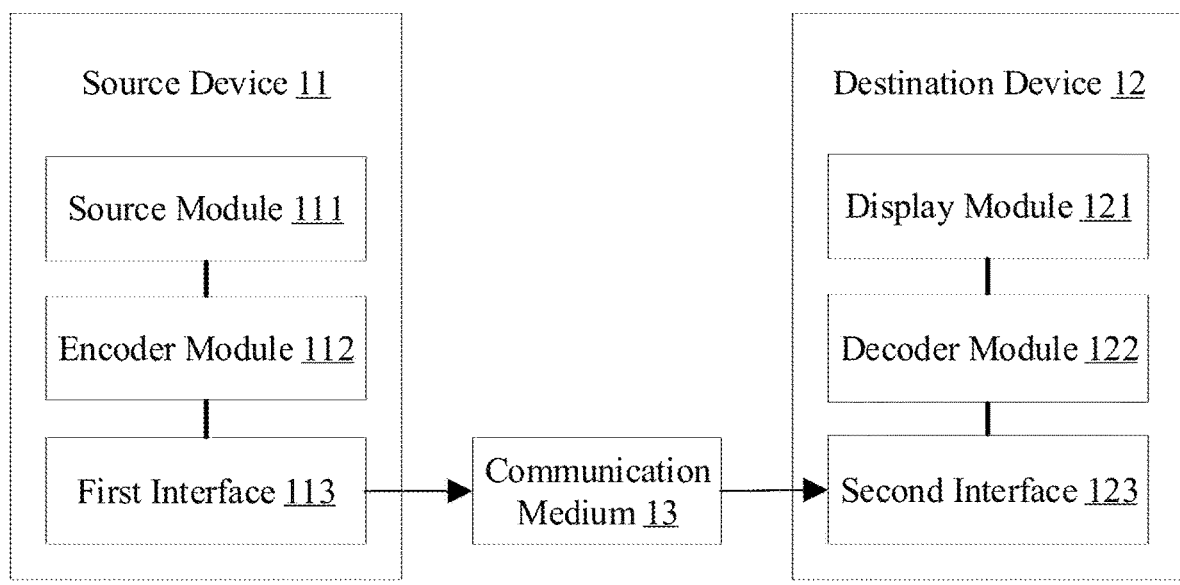
FIG. 1 is a block diagram of an example implementation of a system configured to encode and decode video data according to one or more techniques of this disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any coding function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 is a block diagram of an example implementation of a system that may be configured to encode and decode video data according to one or more techniques of this disclosure. In the implementation, the system includes a source device 11, a destination device 12, and communication medium 13. In at least one implementation, the source device 11 may include any device configured to encode video data and transmit encoded video data to the communication medium 13. In at least one implementation, the destination device 12 may include any device configured to receive encoded video data via the communication medium 13 and to decode encoded video data.

In at least one implementation, the source device 11 may wiredly and/or wirelessly communicate with the destination device 12 via the communication medium 13. The source device 11 may include a source module 111, an encoder module 112, and a first interface 113. The destination device 12 may include a display module 121, a decoder module 122, and a second interface 123. In at least one implementation, the source device 11 may be a video encoder, and the destination device 12 may be a video decoder.

In at least one implementation, the source device 11 and/or the destination device 12 may be a mobile phone, a tablet, a desktop, a notebook, or other electronic device. FIG. 1 merely illustrates one example of the source device 11 and the destination device 12, and the source device 11 and the destination device 12 in other implementations may include more or less components than illustrated, or have a different configuration of the various components.

In at least one implementation, the source module 111 of the source device 11 may include a video capture device to capture a new video, a video archive storing previously captured video, and/or a video feed interface to receive video from a video content provider. In at least one implementation, the source module 111 of the source device 11 may generate computer graphics-based data as the source video, or a combination of live video, archived video, and computer-generated video. In at least one implementation, the video capturing device may be a charge-coupled device (CCD) image sensor, a complementary metal-oxide-semiconductor (CMOS) image sensor, or a camera.

In at least one implementation, the encoder module 112 and the decoder module 122 may each be implemented as any of a variety of suitable encoder/decoder circuitry, such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. In at least one implementation, each of the encoder module 112 and the decoder module 122 may be included in one or more encoders or decoders, any of which may be integrated as part of a combined encoder/decoder (CODEC) in a respective device.

In at least one implementation, the first interface 113 and the second interface 123 may adopt customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 113 and the second interface 123 may each include any device configured to transmit and/or store a compliant video bitstream to the communication medium 13 and to receive the compliant video bitstream from the communication medium 13. In at least one implementation, the first interface 113 and the second interface 123 may include a computer system interface that may enable a compliant video bitstream to be stored on a storage device or to be received from the storage device. For example, the first interface 113 and the second interface 123 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 121 may include a display using liquid crystal display (LCD) technology, a plasma display technology, an organic light emitting diode (OLED) display technology, or light emitting polymer display (LPD) technology, although other display technologies may be used in other implementations. In at least one implementation, the display module 121 may include a high definition display or an ultra high definition display.

Figure 2:
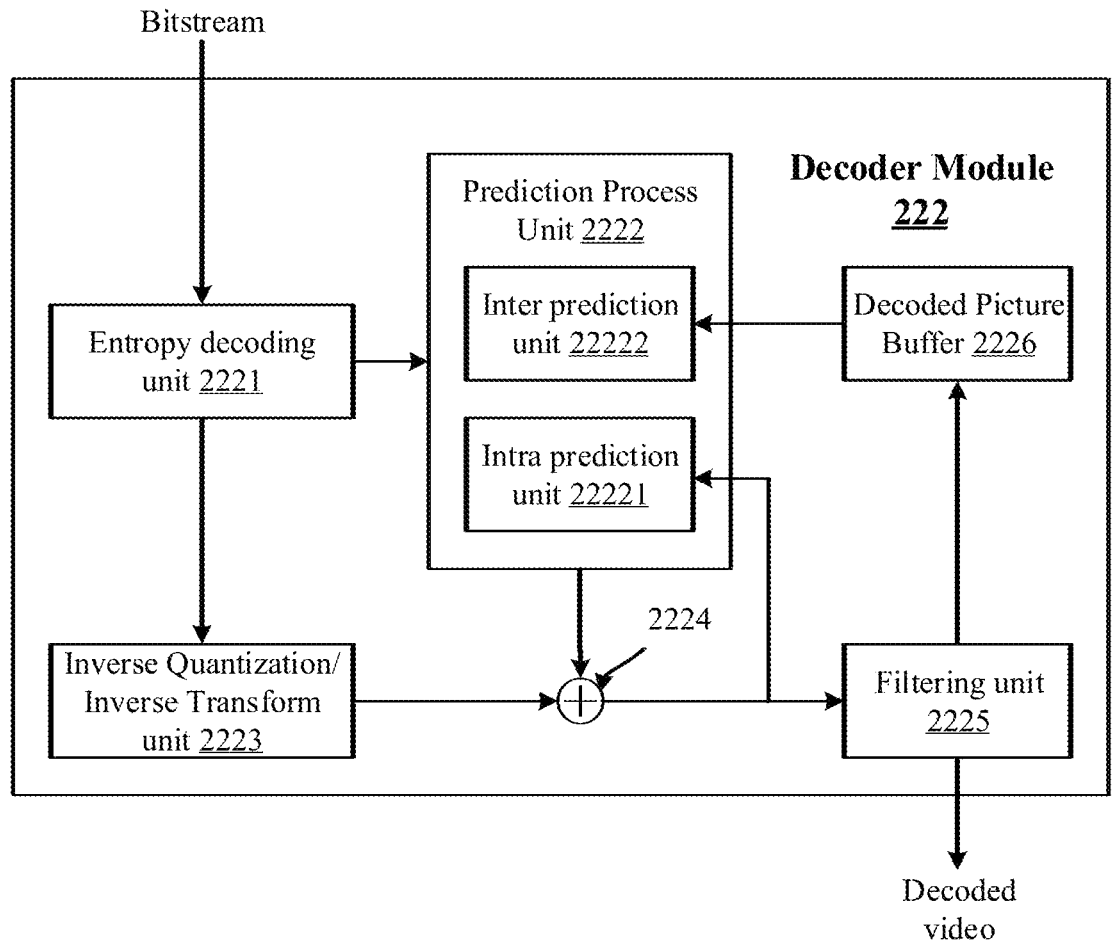
FIG. 2 is a block diagram of an example implementation of the decoder module of the destination device in the system of FIG. 1.

FIG. 2 is a block diagram of a decoder module 222 representing an example implementation of the decoder module 122 of the destination device 12 in the system of FIG. 1. In at least one implementation, the decoder module 222 includes an entropy decoder (e.g., entropy decoding unit 2221), a prediction processor (e.g., prediction process unit 2222), an inverse quantization/inverse transform processor (e.g., inverse quantization/inverse transform unit 2223), a summer (e.g., first summer 2224), a filter (e.g., filtering unit 2225), and a decoded picture buffer (e.g., decoded picture buffer 2226). In at least one implementation, the prediction process unit 2222 of the decoder module 222 further includes an intra prediction processor (e.g., intra prediction unit 22221) and an inter prediction processor (e.g., inter prediction unit 22222). In at least one implementation, the decoder module 222 receives a bitstream, and decodes the bitstream to output a decoded video.

In at least one implementation, the entropy decoding unit 2221 may receive the bitstream including a plurality of syntax elements from the second interface 123 in FIG. 1, and perform a parsing operation on the bitstream to extract syntax elements from the bitstream. As part of performing the parsing operation, the entropy decoding unit 2221 may entropy decode the bitstream to generate quantized transform coefficients, quantization parameters, transform data, motion vectors, intra modes, partition information, and other syntax information. In at least one implementation, the entropy decoding unit 2221 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2221 provides the quantized transform coefficients, the quantization parameters, and the transform data to the inverse quantization/inverse transform unit 2223, and provides the motion vectors, the intra modes, the partition information, and other syntax information to the prediction process unit 2222.

In at least one implementation, the prediction process unit 2222 may receive syntax elements, such as motion vectors, intra modes, partition information, and other syntax information, from the entropy decoding unit 2221. In at least one implementation, the prediction process unit 2222 may receive the syntax elements including the partition information, and then divide image frames according to the partition information. In at least one implementation, each of the image frames may be divided into at least one image block according to the partition information. The at least one image block may include a luminance block for reconstructing a plurality of luminance samples, and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 2222 receives predicted data including the intra mode or the motion vector for a current image block of a specific one of the image frames. The current image block may be one of the luminance block and the at least one of the chrominance block in the specific image frame.

In at least one implementation, the intra prediction unit 22221 may perform intra-predictive coding of a current block unit relative to one or more neighboring blocks in the same frame as the current block unit based on the syntax elements related to the intra mode to generate a predicted block. In at least one implementation, the intra mode may specify the location of reference samples selected from the neighboring blocks within the current frame.

In at least one implementation, the intra prediction unit 22221 may reconstruct a plurality of chroma components of the current block unit based on the plurality of luma components of the current block unit, when the chroma components of the current block are reconstructed by the prediction process unit 2222.

In at least one implementation, the inter prediction unit 22222 may perform inter-predictive coding of the current block unit relative to one or more blocks in one or more reference image block based on the syntax elements related to the motion vector to generate the predicted block. In at least one implementation, the motion vector may indicate a displacement of the current block unit within the current image block relative to a reference block unit within the reference image block. The reference block unit is a block that is determined to closely match the current block unit. In at least one implementation, the inter prediction unit 22222 receives the reference image block stored in the decoded picture buffer 2226 and reconstructs the current block unit based on the received reference image blocks.

In at least one implementation, the inverse quantization/inverse transform unit 2223 may apply inverse quantization and inverse transformation to reconstruct the residual block in the pixel domain. In at least one implementation, the inverse quantization/inverse transform unit 2223 may apply inverse quantization to the residual quantized transform coefficient to generate a residual transform coefficient, and then apply inverse transformation to the residual transform coefficient to generate the residual block in the pixel domain. In at least one implementation, the inverse transformation may be inversely applied the transformation process, such as discrete cosine transform (DCT), discrete sine transform (DST), adaptive multiple transform (AMT), mode-dependent non-separable secondary transform (MDNSST), hypercube-givens transform (HyGT), signal dependent transform, Karhunen-Loéve transform (KLT), wavelet transform, integer transform, sub-band transform or a conceptually similar transform. In at least one implementation, the inverse transformation may convert the residual information from a transform domain, such as a frequency domain, back to the pixel domain. In at least one implementation, the degree of inverse quantization may be modified by adjusting a quantization parameter.

In at least one implementation, the first summer 2224 adds the reconstructed residual block to the predicted block provided from the prediction process unit 2222 to produce a reconstructed block.

In at least one implementation, the filtering unit 2225 may include a deblocking filter, a sample adaptive offset (SAO) filter, a bilateral filter, and/or an adaptive loop filter (ALF) to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the first summer 2224. In at least one implementation, the filtering unit 2225 may output the decoded video to the display module 121 or other video receiving unit, after the filtering unit 2225 performs the filtering process for the reconstructed blocks of the specific image frame.

In at least one implementation, the decoded picture buffer 2226 may be a reference picture memory that stores the reference block for use in decoding the bitstream by the prediction process unit 2222, e.g., in inter-coding modes. The decoded picture buffer 2226 may be formed by any of a variety of memory devices, such as dynamic random access memory (DRAM), including synchronous DRAM (SDRAM), magneto-resistive RAM (MRAM), resistive RAM (RRAM), or other types of memory devices. In at least one implementation, the decoded picture buffer 2226 may be on-chip with other components of the decoder module 222, or off-chip relative to those components.

Figure 3:
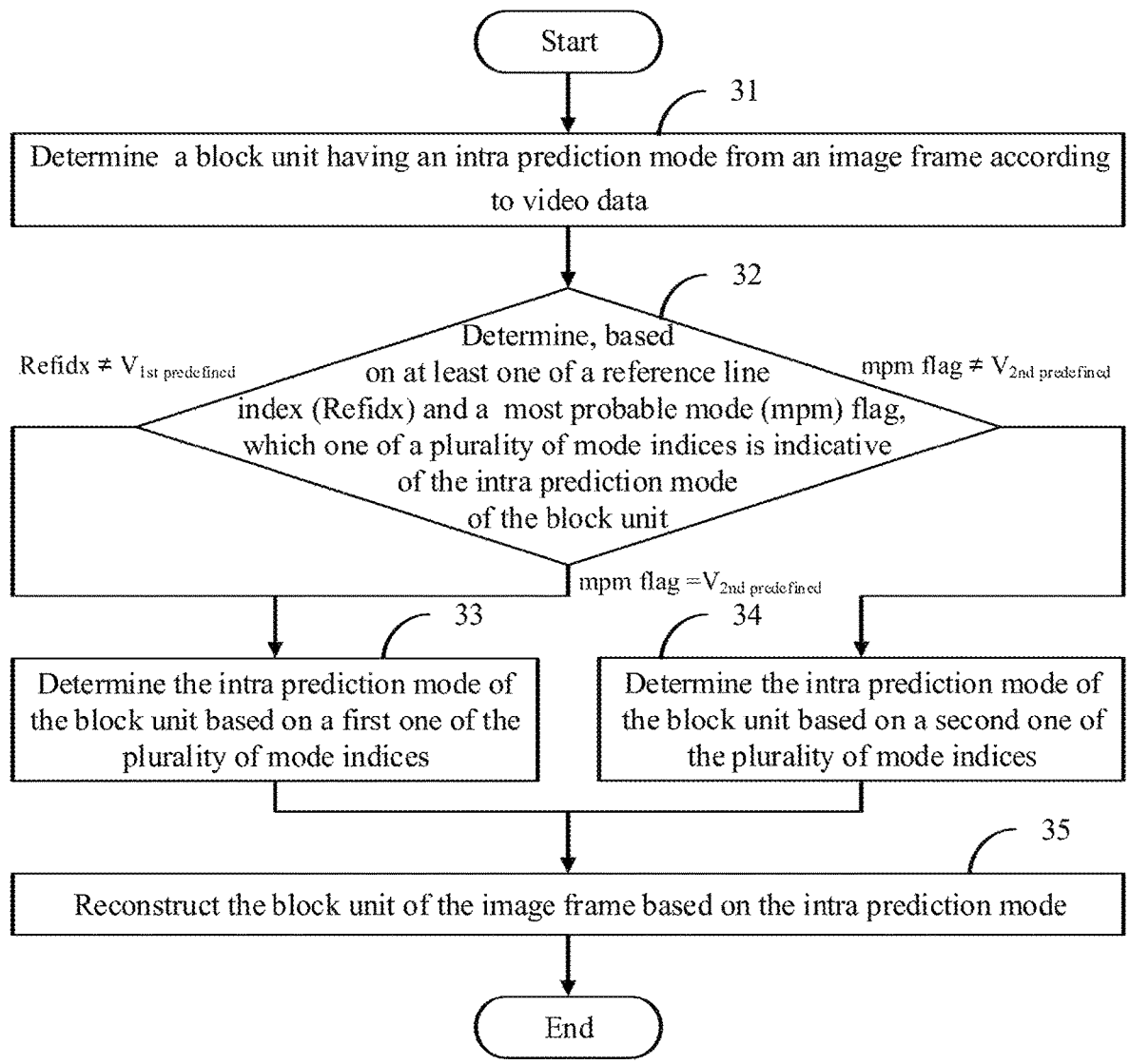
FIG. 3 illustrates a flowchart in accordance with a first example implementation of the mode selection method for intra prediction.

FIG. 3 illustrates a flowchart in accordance with a first example implementation of the mode selection method for intra prediction. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 3 represents one or more processes, methods, or subroutines, carried out in the example method. Furthermore, the order of blocks is illustrative only and may change. Additional blocks may be added or less blocks may be utilized without departing from this disclosure.

At block 31, the decoder module 222 determines a block unit having an intra prediction mode from an image frame according to video data.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 32, the intra prediction unit 22221 determines, based on one of a reference line index (RefIdx) and a most probable mode (mpm) flag, which one of a plurality of mode indices is indicative of the intra prediction mode of the block unit. In at least one implementation, the procedure proceeds to block 33, when the reference line index is different from a first predefined value, or when the mpm flag is equal to a second predefined value. In at least one implementation, the procedure proceeds to block 34, when the mpm flag is different from the second predefined value.

In at least one implementation, there is a plurality of reference line candidates neighboring the block unit. In at least one implementation, each of the reference line candidates includes a plurality of candidate line samples. In at least one implementation, the encoder module 112 may select one of the reference line candidates for predicting the block unit, and provide the reference line index indicating the selected reference line candidate to the destination device 12. In the implementation, the decoder module 222 may determine the selected reference line candidate based on the reference line index, and the intra prediction unit 22221 may determine the candidate line samples in the selected reference line candidate as a plurality of reference line samples. Thus, the decoder module 222 may reconstruct the block unit based on the reference line samples.

Figure 4:
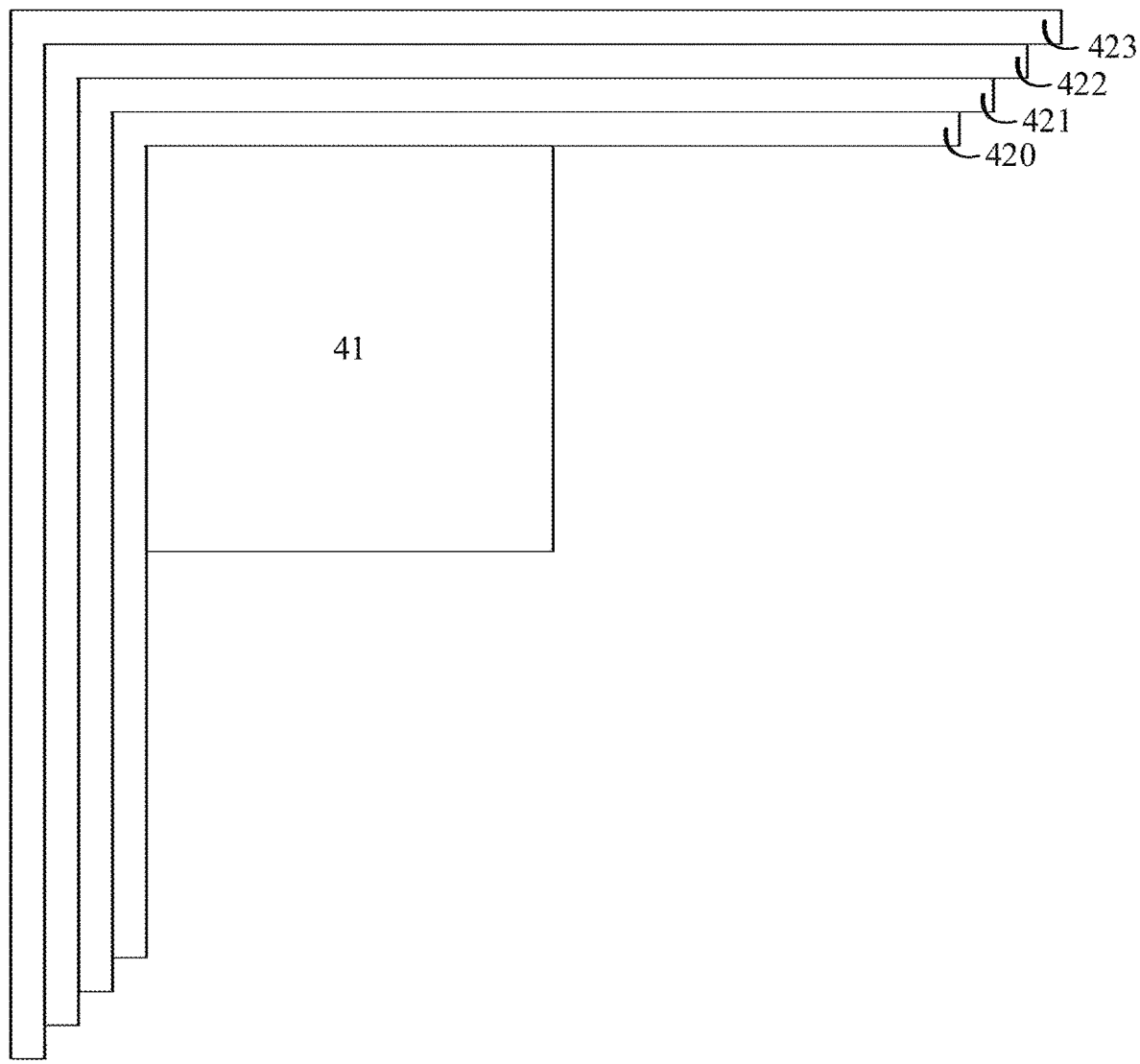
FIG. 4 is a schematic illustration of one example implementation of a block unit and a plurality of reference line candidates neighboring with the block unit.

FIG. 4 is a schematic illustration of an example implementation of the block unit 41, and the reference line candidates 420, 421, 422, and 423 neighboring with the block unit 41. In at least one implementation, the intra prediction unit 22221 may select one of the reference line candidates 420-423 each having the candidate line samples based on the reference line index, and determine the reference line samples in the selected reference line candidates. In at least one implementation, the intra prediction unit 22221 may select the first reference line candidate 420 and determine the reference line samples in the first reference line candidate 420, when the reference line index is equal to a first predefined value. In at least one implementation, the intra prediction unit 22221 may select one of the reference line candidates 421-423, when the reference line index is different from the first predefined value. In at least one implementation, the reference line index may be a syntax element intra_luma_ref_idx in versatile video coding (VVC) or VVC test model (VTM). In at least one implementation, the first predefined value may be equal to zero.

In at least one implementation, the intra prediction unit 22221 may select the intra prediction mode from a plurality of intra mode candidates to predict the block unit. In at least one implementation, the intra mode candidates may include a plurality of non-angular modes and a plurality of angular modes. In the implementation, the non-angular modes may include a Planar mode and a DC mode. In one implementation, the number of the angular modes may be equal to 65, when the decoder module 222 decodes the block unit in VVC or VTM. In another implementation, the number of the angular modes may be equal to 33, when the decoder module 222 decodes the block unit in high efficiency video coding (HEVC). In at least one implementation, the intra prediction unit 22221 may determine a plurality of most probable modes from the intra mode candidates based on a plurality of neighboring blocks neighboring to the block unit. In at least one implementation, a specific one of the intra mode candidates may be set as one of the most probable modes for the block unit, when the intra prediction unit 22221 reconstructs a specific one of the neighboring blocks according to the specific intra mode candidate. In addition, the intra prediction unit 22221 may derive the other of the most probable modes based on the specific intra mode candidate. In the implementation, all of the unselected mode candidates may be regarded as a plurality of remaining mode candidates, when the intra prediction unit 22221 selects the most probable modes from the intra mode candidates. In at least one implementation, the encoder module 112 may set the mpm flag be equal to a second predefined value, when the encoder module 112 selects the intra prediction mode from the most probable modes. In at least one implementation, the encoder module 112 may set the mpm flag be different from the second predefined value, when the encoder module 112 selects the intra prediction mode from the remaining mode candidates. In at least one implementation, the mpm flag may be a syntax element prev_intra_luma_pred_flag in HEVC. In at least one implementation, the mpm flag may be a syntax element intra_luma_mpm_flag in VVC or VTM. In at least one implementation, the second predefined value may be equal to one.

In at least one implementation, the encoder module 112 may select the intra prediction mode from the most probable modes and the remaining mode candidates, when the encoder module 112 selects the first one of the reference line candidate to predict the block unit. In at least one implementation, the encoder module 112 may select the intra prediction mode only from the most probable modes, when the encoder module 112 selects a specific one of the reference line candidates different from the first reference line candidate to predict the block unit.

In at least one implementation, the intra prediction unit 22221 selects the intra prediction mode only from the most probable modes, when the intra prediction unit 22221 selects the specific reference line candidate different from the first reference line candidate to reconstruct the block unit based on the reference line index. Thus, the intra prediction unit 22221 may directly determine that the intra prediction mode is included in the most probable modes, when the intra prediction unit 22221 determines that the reference line index is different from the first predefined value before parsing the mpm flag. In the implementation, the intra prediction unit 22221 may directly determine that the intra prediction mode is included in the most probable modes without parsing the mpm flag, when the intra prediction unit 22221 determines that the reference line index is different from the first predefined value.

In at least one implementation, the intra prediction unit 22221 selects the intra prediction mode only from the most probable modes, when the intra prediction unit 22221 determines the intra prediction mode is included in the most probable modes. In one implementation, the intra prediction unit 22221 may directly determine that the intra prediction mode is included in the most probable modes, when the intra prediction unit 22221 determines that the mpm flag is equal to the second predefined value before parsing the reference line index. Thus, the intra prediction unit 22221 may directly determine that the intra prediction mode is included in the most probable modes without parsing the reference line index, when the intra prediction unit 22221 determines that the mpm flag is equal to the second predefined value. In another implementation, the intra prediction mode may be selected from the most probable modes and the remaining mode candidates, when the intra prediction unit 22221 determines that the first one of the reference line candidates is selected to reconstruct the block unit before parsing the mpm flag. Thus, the intra prediction unit 22221 may further determine whether the mpm flag is equal to the second predefined value. In the implementation, the intra prediction unit 22221 may determine that the intra prediction mode is included in the most probable modes, when the intra prediction unit 22221 determines that the mpm flag is equal to the second predefined value after parsing the reference line index.

In at least one implementation, the intra prediction unit 22221 selects the intra prediction mode only from the remaining mode candidates, when the intra prediction unit 22221 determines the intra prediction mode is not included in the most probable modes. In one implementation, the intra prediction unit 22221 may directly determine that the intra prediction mode is included in the remaining mode candidates, when the intra prediction unit 22221 determines that the mpm flag is different from the second predefined value before parsing the reference line index. Thus, the intra prediction unit 22221 may directly determine that the intra prediction mode is included in the remaining mode candidates without parsing the reference line index, when the intra prediction unit 22221 determines that the mpm flag is different from the second predefined value. In another implementation, the intra prediction mode may be selected from the most probable modes and the remaining mode candidates, when the intra prediction unit 22221 determines that the first one of the reference line candidates is selected to reconstruct the block unit before parsing the mpm flag. Thus, the intra prediction unit 22221 may further determine whether the mpm flag is equal to the second predefined value. In the implementation, the intra prediction unit 22221 may determine that the intra prediction mode is included in the remaining mode candidates, when the intra prediction unit 22221 determines that the mpm flag is different from the second predefined value after parsing the reference line index.

At block 33, the intra prediction unit 22221 determines the intra prediction mode of the block unit based on a first one of the plurality of mode indices.

In at least one implementation, the intra prediction unit 22221 may determine the intra prediction mode of the block unit is included in the most probable modes, when the reference line index is different from the first predefined value or the mpm flag is equal to the second predefined value. In the implementation, the intra prediction unit 22221 may select one of the most probable modes as the intra prediction mode based on the first one of the mode indices. In at least one implementation, the prediction indications may include the mode indices. In at least one implementation, the first one of the mode indices may be an mpm index for selecting the intra prediction mode from the most probable modes. In at least one implementation, the mpm index may be a syntax element mpm_idx in HEVC. In at least one implementation, the mpm index may be a syntax element intra_luma_mpm_idx in VVC or VTM.

In at least one implementation, the encoder module 112 may add the non-angular modes into the most probable modes, when the encoder module 112 selects the first reference line candidate to predict the block unit. Thus, the encoder module 112 may add the Planar mode and the DC mode into the most probable modes, when the encoder module 112 selects the first reference line candidate to predict the block unit. In the implementation, the intra prediction unit 22221 also determines that the Planar mode and the DC mode are included in the most probable modes, when the intra prediction unit 22221 selects the first reference line candidate to reconstruct the block unit based on the reference line index. In other words, the Planar mode and the DC mode may be selected to reconstruct the block unit based on the first one of the mode indices, when the intra prediction unit 22221 selects the first reference line candidate to reconstruct the block unit.

In at least one implementation, the encoder module 112 may exclude the non-angular modes from the most probable modes, when the encoder module 112 select the specific reference line candidate different from the first reference line candidate to predict the block unit. Thus, the Planar mode and the DC mode are not included in the most probable modes, when the encoder module 112 does not select the first reference line candidate to predict the block unit. In the implementation, the intra prediction unit 22221 may exclude the Planar mode and the DC mode from the most probable modes, when the intra prediction unit 22221 determines that the specific reference line candidate different from the first reference line candidate is selected to reconstruct the block unit based on the reference line index. In other words, the intra prediction mode may be selected only from the angular modes included in the most probable modes based on the first one of the mode indices, when the intra prediction unit 22221 selects the specific reference line candidate different from the first reference line candidate to reconstruct the block unit.

At block 34, the intra prediction unit 22221 determines the intra prediction mode of the block unit based on a second one of the plurality of mode indices.

In at least one implementation, the intra prediction unit 22221 may determine the intra prediction mode of the block unit is included in the remaining mode candidates, when the mpm flag is different from the second predefined value. In the implementation, the intra prediction unit 22221 may select one of the remaining mode candidates as the intra prediction mode based on the second one of the mode indices. In at least one implementation, the second one of the mode indices may be a non-mpm index for selecting the intra prediction mode from the remaining mode candidates. In at least one implementation, the non-mpm index may be a syntax element rem_intra_luma_pred_mode in HEVC. In at least one implementation, the non-mpm index may be a syntax element intra_luma_mpm_remainder in VVC or VTM.

In at least one implementation, the encoder module 112 may select the intra prediction mode only from the most probable modes, when the encoder module 112 selects the specific reference line candidate different from the first reference line candidate to predict the block unit. Thus, the first reference line candidate is selected to predict the block unit by the encoder module 112, when the encoder module 112 selects the intra prediction mode from the remaining mode candidates. In at least one implementation, the intra prediction unit 22221 may add the non-angular modes into the most probable modes, when the intra prediction unit 22221 selects the first reference line candidate to reconstruct the block unit based on the reference line index. In other words, the non-angular modes are not included in the remaining mode candidates. Thus, the Planar mode, and the DC mode may not be selected, when the intra prediction unit 22221 determines the intra prediction mode of the block unit based on the second one of the plurality of mode indices.

At block 35, the intra prediction unit 22221 reconstructs the block unit of the image frame based on the intra prediction mode.

In at least one implementation, the block unit may include a plurality of block elements. In the implementation, each of the block elements may be a pixel element. The intra prediction unit 22221 may select, based on the intra prediction mode, at least one of the reference line samples in the selected reference line candidates for each of the block elements. Then, the intra prediction unit 22221 may generate one of the predictors for each of the block elements.

In at least one implementation, the first summer 2224 of the decoder module 222 in the destination device 12 may add the predictors into a plurality of residual samples determined from the bitstream to reconstruct the block unit. In addition, the decoder module 222 may reconstruct all of the other block units in the image frame for reconstructing the image frame and the video.

Figure 5:
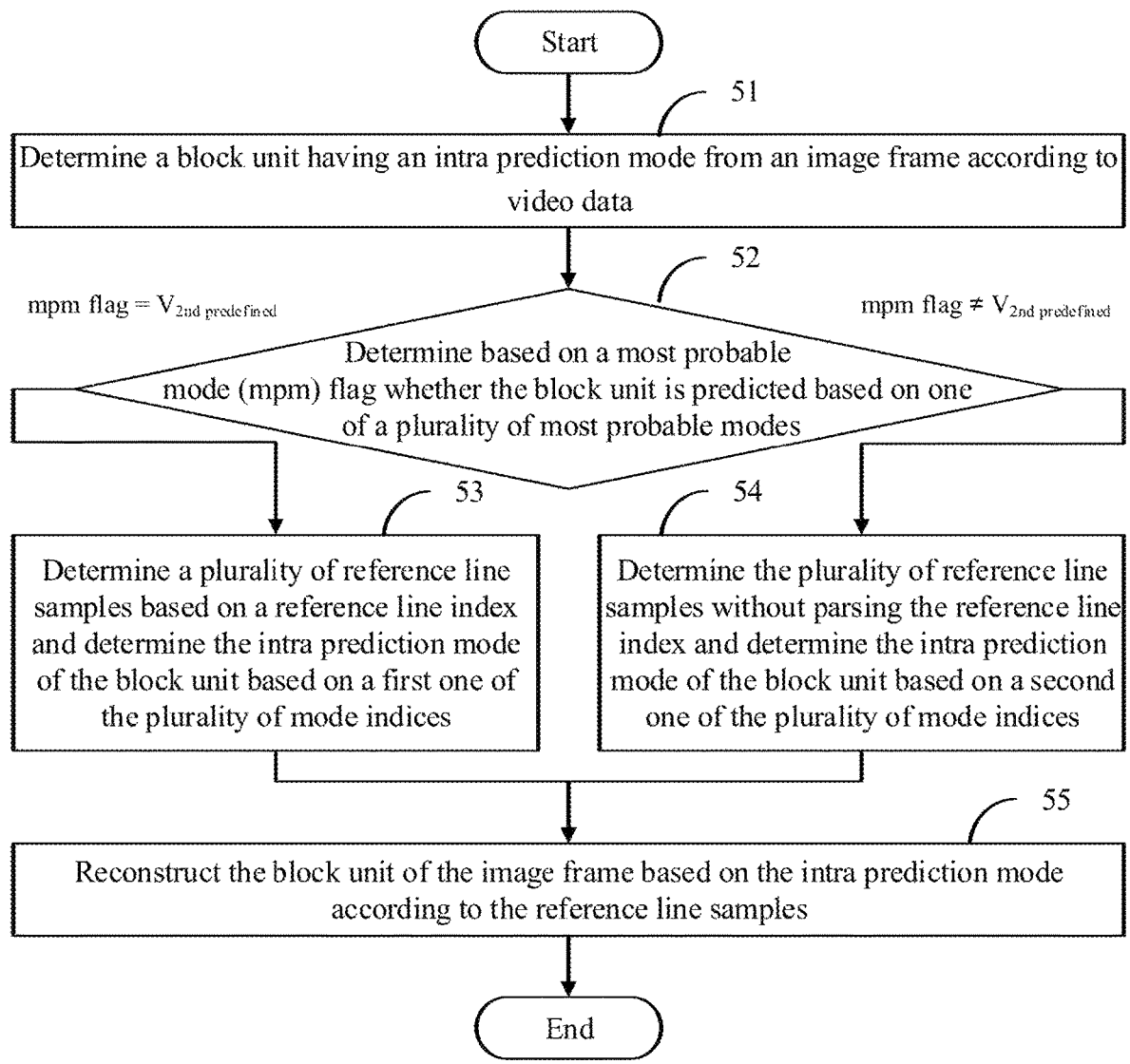
FIG. 5 illustrates a flowchart in accordance with a second example implementation of the mode selection method for intra prediction.

FIG. 5 illustrates a flowchart in accordance with a second example implementation of the mode selection method for intra prediction. The mode selection method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 5 represents one or more processes, methods, or subroutines, carried out in the example method. Furthermore, the order of blocks is illustrative only and may change. Additional blocks may be added or less blocks may be utilized without departing from this disclosure.

At block 51, the decoder module 222 determines a block unit having an intra prediction mode from an image frame according to video data.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit having a block size according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 52, the intra prediction unit 22221 determines, based on a most probable mode (mpm) flag, whether the block unit is predicted based on one of a plurality most probable modes. In at least one implementation, the procedure proceeds to block 53, when the mpm flag is equal to a second predefined value. In at least one implementation, the procedure proceeds to block 54, when the mpm flag is difference from the second predefined value.

In at least one implementation, the intra prediction unit 22221 may select the intra prediction mode from a plurality of intra mode candidates to predict the block unit. In at least one implementation, the intra mode candidates may include a plurality of non-angular modes and a plurality of angular modes. In the implementation, the non-angular modes may include a Planar mode and a DC mode. In one implementation, the number of the angular modes may be equal to 65, when the decoder module 222 decodes the block unit in VVC or VTM. In another implementation, the number of the angular modes may be equal to 33, when the decoder module 222 decodes the block unit in HEVC. In at least one implementation, the intra prediction unit 22221 may determine the plurality of most probable modes from the intra mode candidates based on a plurality of neighboring blocks neighboring to the block unit. In at least one implementation, a specific one of the intra mode candidates may be set as one of the most probable modes for the block unit, when the intra prediction unit 22221 reconstructs a specific one of the neighboring blocks according to the specific intra mode candidate. In addition, the intra prediction unit 22221 may derive the other most probable modes based on the specific intra mode candidate. In the implementation, all of the unselected mode candidates may be regarded as a plurality of remaining mode candidates, when the intra prediction unit 22221 selects the most probable modes from the intra mode candidates. In at least one implementation, the encoder module 112 may set the mpm flag be equal to the second predefined value, when the encoder module 112 selects the intra prediction mode from the most probable modes. In at least one implementation, the encoder module 112 may set the mpm flag be different from the second predefined value, when the encoder module 112 selects the intra prediction mode from the remaining mode candidates. In at least one implementation, the mpm flag may be a syntax element prev_intra_luma_pred_flag in HEVC. In at least one implementation, the mpm flag may be a syntax element intra_luma_mpm_flag in VVC or VTM. In at least one implementation, the second predefined value may be equal to one.

At block 53, the intra prediction unit 22221 determines a plurality of reference line samples based on a reference line index, and determines the intra prediction mode of the block unit based on a first one of a plurality of mode indices.

In at least one implementation, there are a plurality of reference line candidates neighboring with the block unit. In at least one implementation, each of the reference line candidates includes a plurality of candidate line samples. In at least one implementation, the encoder module 112 may select one of the reference line candidates for predicting the block unit, and provide the reference line index indicating the selected reference line candidate to the destination device 12. In the implementation, the decoder module 222 may determine the selected reference line candidate based on the reference line index, and determine the candidate line samples in the selected reference line candidate as the reference line samples. Thus, the decoder module 222 may reconstruct the block unit based on the reference line samples. In at least one implementation, the reference line index may be a syntax element intra_luma_ref_idx in VVC or VTM. In at least one implementation, the first predefined value may be equal to zero.

In at least one implementation, the encoder module 112 may select the intra prediction mode from the most probable modes and the remaining mode candidates, when the encoder module 112 selects the first one of the reference line candidate to predict the block unit. In at least one implementation, the encoder module 112 may select the intra prediction mode only from the most probable modes, when the encoder module 112 selects a specific one of the reference line candidates different from the first reference line candidate to predict the block unit. Thus, each of the reference line candidate may be selectable for the block unit, after the intra prediction unit 22221 determines that the intra prediction mode is selected from the most probable modes.

In at least one implementation, the intra prediction unit 22221 may determine the intra prediction mode of the block unit is included in the most probable modes, when the mpm flag is equal to the second predefined value. In the implementation, the intra prediction unit 22221 may select one of the most probable modes as the intra prediction mode based on the first one of the mode indices. In at least one implementation, the prediction indications may include the mode indices. In at least one implementation, the first one of the mode indices may be an mpm index for selecting the intra prediction mode from the most probable modes. In at least one implementation, the mpm index may be a syntax element mpm_idx in HEVC. In at least one implementation, the mpm index may be a syntax element intra_luma_mpm_idx in VVC or VTM.

In at least one implementation, the encoder module 112 may add the non-angular modes into the most probable modes, when the encoder module 112 selects the first reference line candidate to predict the block unit. Thus, the encoder module 112 may add the Planar mode and the DC mode into the most probable modes, when the encoder module 112 selects the first reference line candidate to predict the block unit. In the implementation, the intra prediction unit 22221 also determines that the Planar mode and the DC mode are included in the most probable modes, when the intra prediction unit 22221 selects the first reference line candidate to reconstruct the block unit based on the reference line index. In other words, the Planar mode and the DC mode may be selected to reconstruct the block unit based on the first one of the mode indices, when the intra prediction unit 22221 selects the first reference line candidate to reconstruct the block unit.

In at least one implementation, the encoder module 112 may exclude the non-angular modes from the most probable modes, when the encoder module 112 select the specific reference line candidate different from the first reference line candidate to predict the block unit. Thus, the Planar mode and the DC mode are not included in the most probable modes, when the encoder module 112 does not select the first reference line candidate to predict the block unit. In the implementation, the intra prediction unit 22221 may exclude the Planar mode and the DC mode into the most probable modes, when the intra prediction unit 22221 determines that the specific reference line candidate different from the first reference line candidate is selected to reconstruct the block unit based on the reference line index. In other words, the intra prediction mode may be selected only from the angular modes included in the most probable modes based on the first one of the mode indices, when the intra prediction unit 22221 selects the specific reference line candidate different from the first reference line candidate to reconstruct the block unit.

At block 54, the intra prediction unit 22221 determines the plurality of reference line samples without parsing the reference line index, and determines the intra prediction mode of the block unit based on a second one of the plurality of mode indices.

In at least one implementation, the encoder module 112 may select the intra prediction mode from the most probable modes and the remaining mode candidates, when the encoder module 112 selects the first one of the reference line candidate to predict the block unit. However, the encoder module 112 may select the intra prediction mode only from the most probable modes, when the encoder module 112 selects the specific reference line candidate different from the first reference line candidate to predict the block unit. Thus, the intra prediction unit 22221 may directly determine the first reference line candidate as the selected reference line candidate without parsing the reference line index, after intra prediction unit 22221 determines that the intra prediction mode is selected from the remaining mode candidates based on the mpm flag.

In at least one implementation, the intra prediction unit 22221 may determine the intra prediction mode of the block unit is included in the remaining mode candidates, when the mpm flag is different from the second predefined value. In the implementation, the intra prediction unit 22221 may select one of the remaining mode candidates as the intra prediction mode based on the second one of the mode indices. In at least one implementation, the second one of the mode indices may be a non-mpm index for selecting the intra prediction mode from the remaining mode candidates. In at least one implementation, the non-mpm index may be a syntax element rem_intra_luma_pred_mode in HEVC. In at least one implementation, the non-mpm index may be a syntax element intra_luma_mpm_remainder in VVC or VTM.

In at least one implementation, the intra prediction unit 22221 may add the non-angular modes into the most probable modes, when the intra prediction unit 22221 selects the first reference line candidate to reconstruct the block unit. In other words, the non-angular modes are not included in the remaining mode candidates. Thus, the Planar mode, and the DC mode may not be selected, when the intra prediction unit 22221 determines the intra prediction mode of the block unit based on the second one of the plurality of mode indices.

At block 55, the intra prediction unit 22221 reconstructs the block unit of the image frame based on the intra prediction mode according to the reference line samples.

In at least one implementation, the block unit may include a plurality of block elements. In the implementation, each of the block elements may be a pixel element. The intra prediction unit 22221 may select, based on the intra prediction mode, at least one of the reference line samples in the selected reference line candidates for each of the block elements. Then, the intra prediction unit 22221 may generate one of the predictors for each of the block elements.

In at least one implementation, the first summer 2224 of the decoder module 222 in the destination device 12 may add the predictors into a plurality of residual samples determined from the bitstream to reconstruct the block unit. In addition, the decoder module 222 may reconstruct all of the other block units in the image frame for reconstructing the image frame and the video.

Figure 6:
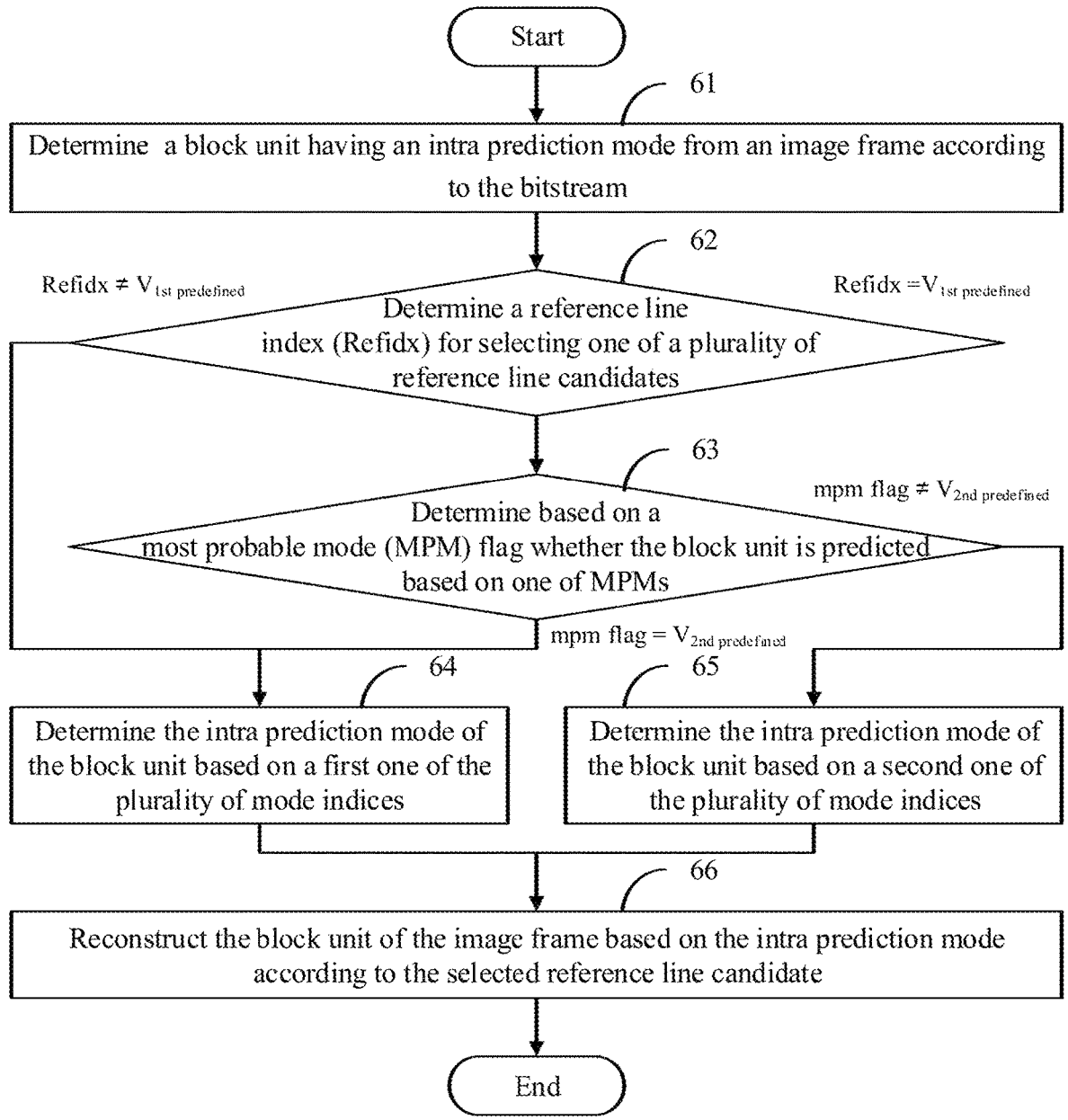
FIG. 6 illustrates a flowchart in accordance with a third example implementation of the mode selection method for intra prediction.

FIG. 6 illustrates a flowchart in accordance with a third example implementation of the mode selection method for intra prediction. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 6 represents one or more processes, methods, or subroutines, carried out in the example method. Furthermore, the order of blocks is illustrative only and may change. Additional blocks may be added or less blocks may be utilized without departing from this disclosure.

At block 61, the decoder module 222 determines a block unit having an intra prediction mode from an image frame according to video data.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 62, the intra prediction unit 22221 determines a reference line index (Refidx) for selecting one of a plurality of reference line candidates. In at least one implementation, the procedure proceeds to block 63, when the reference line index is equal to a first predefined value. In at least one implementation, the procedure proceeds to block 64, when the reference line index is different from the first predefined value.

In at least one implementation, each of the reference line candidates includes a plurality of candidate line samples. In at least one implementation, the encoder module 112 may select one of the reference line candidates for predicting the block unit, and provide the reference line index indicating the selected reference line candidate to the destination device 12. In the implementation, the decoder module 222 may determine the selected reference line candidate based on the reference line index, and the intra prediction unit 22221 may determine the candidate line samples in the selected reference line candidate as a plurality of reference line samples. Thus, the decoder module 222 may reconstruct the block unit based on the reference line samples. FIG. 4 is a schematic illustration of an example implementation of the block unit 41, and the reference line candidates 420-423 neighboring with the block unit 41. In at least one implementation, the intra prediction unit 22221 may select one of the reference line candidates 420-423 each having the candidate line samples based on the reference line index, and determine the reference line samples in the selected reference line candidates. In at least one implementation, the intra prediction unit 22221 may select the first reference line candidate 420 and determine the reference line samples in the first reference line candidate 420, when the reference line index is equal to a first predefined value. In at least one implementation, the intra prediction unit 22221 may select one of the reference line candidates 421-423, when the reference line index is different from the first predefined value. In at least one implementation, the reference line index may be a syntax element intra_luma_ref_idx in VCC or VTM. In at least one implementation, the first predefined value may be equal to zero.

In at least one implementation, the intra prediction unit 22221 may select the intra prediction mode from a plurality of intra mode candidates to predict the block unit. In at least one implementation, the intra mode candidates may include a plurality of non-angular modes and a plurality of angular modes. In the implementation, the non-angular modes may include a Planar mode and a DC mode. In one implementation, the number of the angular modes may be equal to 65, when the decoder module 222 decodes the block unit in VVC or VTM. In another implementation, the number of the angular modes may be equal to 33, when the decoder module 222 decodes the block unit in HEVC. In at least one implementation, the intra prediction unit 22221 may determine a plurality of most probable modes from the intra mode candidates based on a plurality of neighboring blocks neighboring to the block unit. In at least one implementation, a specific one of the intra mode candidates may be set as one of the most probable modes for the block unit, when the intra prediction unit 22221 reconstructs a specific one of the neighboring blocks according to the specific intra mode candidate. In addition, the intra prediction unit 22221 may derive the other of the most probable modes based on the specific intra mode candidate. In the implementation, all of the unselected mode candidates may be regarded as a plurality of remaining mode candidates, when the intra prediction unit 22221 selects the most probable modes from the intra mode candidates.

In at least one implementation, the encoder module 112 may select the intra prediction mode from the most probable modes and the remaining mode candidates, when the encoder module 112 selects the first one of the reference line candidate to predict the block unit. In at least one implementation, the encoder module 112 may select the intra prediction mode only from the most probable modes, when the encoder module 112 selects a specific one of the reference line candidates different from the first reference line candidate to predict the block unit.

In at least one implementation, the intra prediction unit 22221 selects the intra prediction mode only from the most probable modes, when the intra prediction unit 22221 selects the specific reference line candidate to reconstruct the block unit based on the reference line index. Thus, the intra prediction unit 22221 may directly determine that the intra prediction mode is included in the most probable modes, when the intra prediction unit 22221 determines that the reference line index is different from the first predefined value before determining a list flag indicating whether the intra prediction mode is selected from the most probable modes. In the implementation, the intra prediction unit 22221 may directly determine that the intra prediction mode is included in the most probable modes without parsing the list flag, when the intra prediction unit 22221 determines that the reference line index is different from the first predefined value.

In at least one implementation, the intra prediction mode may be selected from the most probable modes and the remaining mode candidates, when the intra prediction unit 22221 determines that the first one of the reference line candidates is selected to reconstruct the block unit. Thus, the intra prediction unit 22221 may further determine whether the intra prediction mode is selected from the most probable modes or the remaining mode candidates.

At block 63, the intra prediction unit 22221 determines, based on a most probable mode (mpm) flag, whether the block unit is predicted based on one of the most probable modes. In at least one implementation, the procedure proceeds to block 64, when the mpm flag is equal to a second predefined value. In at least one implementation, the procedure proceeds to block 65, when the mpm flag is different from the second predefined value.

In at least one implementation, the encoder module 112 may set the mpm flag be equal to the second predefined value, when the encoder module 112 selects the intra prediction mode from the most probable modes to predict the block unit. In at least one implementation, the encoder module 112 may set the mpm flag be different from the second predefined value, when the encoder module 112 selects the intra prediction mode from the remaining mode candidates to predict the block unit. In at least one implementation, the mpm flag may be a syntax element prev_intra_luma_pred_flag in HEVC. In at least one implementation, the mpm flag may be a syntax element intra_luma_mpm_flag in VVC or VTM. In at least one implementation, the second predefined value may be equal to one.

In at least one implementation, the intra prediction mode may be selected from the most probable modes and the remaining mode candidates, when the intra prediction unit 22221 determines that the first reference line candidate is selected to reconstruct the block unit before parsing the list flag. In the implementation, the list flag is the mpm flag for determining whether the intra prediction mode is selected from the most probable modes or the remaining mode candidates. Thus, the intra prediction unit 22221 may further determine whether the mpm flag is equal to the second predefined value. In one implementation, the intra prediction unit 22221 may determine that the intra prediction mode is included in the remaining mode candidates, when the intra prediction unit 22221 determines that the mpm flag is different from the second predefined value. In another implementation, the intra prediction unit 22221 may determine that the intra prediction mode is included in the most probable modes, when the intra prediction unit 22221 determines that the mpm flag is equal to the second predefined value.

At block 64, the intra prediction unit 22221 determines the intra prediction mode of the block unit based on a first one of the plurality of mode indices.

In at least one implementation, the intra prediction unit 22221 may determine the intra prediction mode of the block unit is included in the most probable modes, when the reference line index is different from the first predefined value or the mpm flag is equal to the second predefined value. In the implementation, the intra prediction unit 22221 may select one of the most probable modes as the intra prediction mode based on the first one of the mode indices. In at least one implementation, the prediction indications may include the mode indices. In at least one implementation, the first one of the mode indices may be an mpm index for selecting the intra prediction mode from the most probable modes. In at least one implementation, the mpm index may be a syntax element mpm_idx in HEVC. In at least one implementation, the mpm index may be a syntax element intra_luma_mpm_idx in VVC or VTM.

In at least one implementation, the encoder module 112 may add the non-angular modes into the most probable modes, when the encoder module 112 selects the first reference line candidate to predict the block unit. Thus, the encoder module 112 may add the Planar mode and the DC mode into the most probable modes, when the encoder module 112 selects the first reference line candidate to predict the block unit. In the implementation, the intra prediction unit 22221 also determines that the Planar mode and the DC mode are included in the most probable modes, when the intra prediction unit 22221 selects the first reference line candidate to reconstruct the block unit based on the reference line index. In other words, the Planar mode and the DC mode may be selected to reconstruct the block unit based on the first one of the mode indices, when the intra prediction unit 22221 selects the first reference line candidate to reconstruct the block unit.

In at least one implementation, the encoder module 112 may exclude the non-angular modes from the most probable modes, when the encoder module 112 select the specific reference line candidate different from the first reference line candidate to predict the block unit. Thus, the Planar mode and the DC mode are not included in the most probable modes, when the encoder module 112 does not select the first reference line candidate to predict the block unit. In the implementation, the intra prediction unit 22221 may exclude the Planar mode and the DC mode from the most probable modes, when the intra prediction unit 22221 determines that the specific reference line candidate different from the first reference line candidate is selected to reconstruct the block unit based on the reference line index. In other words, the intra prediction mode may be selected only from the angular modes included in the most probable modes based on the first one of the mode indices, when the intra prediction unit 22221 selects the specific reference line candidate different from the first reference line candidate to reconstruct the block unit.

At block 65, the intra prediction unit 22221 determines the intra prediction mode of the block unit based on a second one of the plurality of mode indices.

In at least one implementation, the intra prediction unit 22221 may determine the intra prediction mode of the block unit is included in the remaining mode candidates, when the mpm flag is different from the second predefined value. In the implementation, the intra prediction unit 22221 may select one of the remaining mode candidates as the intra prediction mode based on the second one of the mode indices. In at least one implementation, the second one of the mode indices may be a non-mpm index for selecting the intra prediction mode from the remaining mode candidates. In at least one implementation, the non-mpm index may be a syntax element rem_intra_luma_pred_mode in HEVC. In at least one implementation, the non-mpm index may be a syntax element intra_luma_mpm_remainder in VVC or VTM.

In at least one implementation, the first reference line candidate is selected to reconstruct the block unit, when the intra prediction mode is selected from the remaining mode candidates. In at least one implementation, the intra prediction unit 22221 may add the non-angular modes into the most probable modes, when the intra prediction unit 22221 selects the first reference line candidate to reconstruct the block unit based on the reference line index. In other words, the non-angular modes are not included in the remaining mode candidates. Thus, the Planar mode, and the DC mode may not be selected, when the intra prediction unit 22221 determines the intra prediction mode of the block unit based on the second one of the plurality of mode indices. In the implementation, the intra prediction mode is one of the angular modes when the intra prediction unit 22221 determines the intra prediction mode of the block unit based on the second one of the plurality of mode indices.

At block 66, the intra prediction unit 22221 reconstructs the block unit of the image frame based on the intra prediction mode according to the selected reference line candidate.

In at least one implementation, the block unit may include a plurality of block elements. In the implementation, each of the block elements may be a pixel element. The intra prediction unit 22221 may select, based on the intra prediction mode, at least one of the reference line samples in the selected reference line candidates for each of the block elements. Then, the intra prediction unit 22221 may generate one of the predictors for each of the block elements.

In at least one implementation, the first summer 2224 of the decoder module 222 in the destination device 12 may add the predictors into a plurality of residual samples determined from the bitstream to reconstruct the block unit. In addition, the decoder module 222 may reconstruct all of the other block units in the image frame for reconstructing the image frame and the video.

Figure 7:
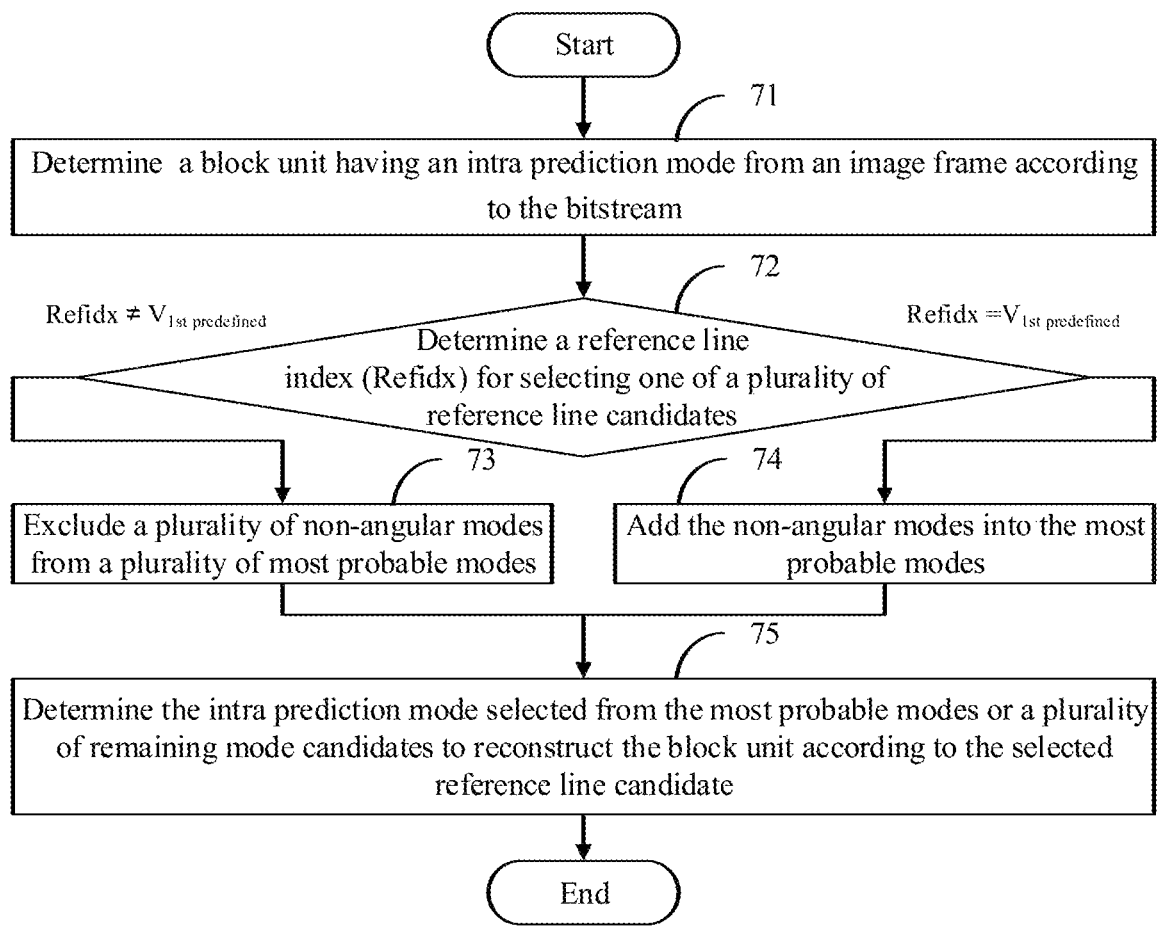
FIG. 7 illustrates a flowchart in accordance with a fourth example implementation of the mode selection method for intra prediction.

FIG. 7 illustrates a flowchart in accordance with a fourth example implementation of the mode selection method for intra prediction. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 7 represents one or more processes, methods, or subroutines, carried out in the example method. Furthermore, the order of blocks is illustrative only and may change. Additional blocks may be added or less blocks may be utilized without departing from this disclosure.

At block 71, the decoder module 222 determines a block unit having an intra prediction mode from an image frame according to video data.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 72, the intra prediction unit 22221 determines a reference line index (Refidx) for selecting one of a plurality of reference line candidates. In at least one implementation, the procedure proceeds to block 73, when the reference line index is different from a first predefined value. In at least one implementation, the procedure proceeds to block 74, when the reference line index is equal to the first predefined value.

In at least one implementation, each of the reference line candidates includes a plurality of candidate line samples. In at least one implementation, the encoder module 112 may select one of the reference line candidates for predicting the block unit, and provide the reference line index indicating the selected reference line candidate to the destination device 12. In the implementation, the decoder module 222 may determine the selected reference line candidate based on the reference line index, and the intra prediction unit 22221 may determine the candidate line samples in the selected reference line candidate as a plurality of reference line samples. Thus, the decoder module 222 may reconstruct the block unit based on the reference line samples. FIG. 4 is a schematic illustration of an example implementation of the block unit 41, and the reference line candidates 420-423 neighboring with the block unit 41. In at least one implementation, the intra prediction unit 22221 may select one of the reference line candidates 420-423 each having the candidate line samples based on the reference line index, and determine the reference line samples in the selected reference line candidates. In at least one implementation, the intra prediction unit 22221 may select the first reference line candidate 420 and determine the reference line samples in the first reference line candidate 420, when the reference line index is equal to a first predefined value. In at least one implementation, the intra prediction unit 22221 may select one of the reference line candidates 421-423, when the reference line index is different from the first predefined value. In at least one implementation, the reference line index may be a syntax element intra_luma_ref_idx in VVC or VTM. In at least one implementation, the first predefined value may be equal to zero.

In at least one implementation, the intra prediction unit 22221 may select the intra prediction mode from a plurality of intra mode candidates to predict the block unit. In at least one implementation, the intra mode candidates may include a plurality of non-angular modes and a plurality of angular modes. In the implementation, the non-angular modes may include a Planar mode and a DC mode. In one implementation, the number of the angular modes may be equal to 65, when the decoder module 222 decodes the block unit in VVC or VTM. In another implementation, the number of the angular modes may be equal to 33, when the decoder module 222 decodes the block unit in HEVC. In at least one implementation, the intra prediction unit 22221 may determine a plurality of most probable modes from the intra mode candidates based on a plurality of neighboring blocks neighboring to the block unit. In at least one implementation, a specific one of the intra mode candidates may be set as one of the most probable modes for the block unit, when the intra prediction unit 22221 reconstructs a specific one of the neighboring blocks according to the specific intra mode candidate. In addition, the intra prediction unit 22221 may derive the other of the most probable modes based on the specific intra mode candidate. In the implementation, all of the unselected mode candidates may be regarded as a plurality of remaining mode candidates, when the intra prediction unit 22221 selects the most probable modes from the intra mode candidates.

In at least one implementation, the non-angular modes may be added into the most probable modes, when the intra prediction unit 22221 selects the first one of the reference line candidate to predict the block unit. In other words, the non-angular modes may be excluded from the remaining mode candidates. In at least one implementation, the non-angular modes may be excluded from the most probable modes, when the intra prediction unit 22221 selects a specific one of the reference line candidates different from the first reference line candidate to predict the block unit.

At block 73, the intra prediction unit 22221 excludes the non-angular modes from the most probable modes.

In at least one implementation, each of the most probable modes is selected from the angular modes, since the non-angular modes are not added into the most probable modes. In the implementation, the intra prediction mode is one of the angular modes, when the intra prediction mode is selected from the most probable modes.

At block 74, the intra prediction unit 22221 adds the non-angular modes into the most probable modes.

In at least one implementation, each of the remaining mode candidates is selected from the angular modes, since the non-angular modes are added into the most probable modes. In the implementation, the intra prediction mode is one of the angular modes, when the intra prediction mode is selected from the remaining mode candidates. In addition, the intra prediction mode is one of the non-angular modes and the angular modes, when the intra prediction mode is selected from the most probable modes.

At block 75, the intra prediction unit 22221 determines the intra prediction mode selected from the most probable modes or the remaining mode candidates to reconstruct the block unit according to the selected reference line candidate.

In at least one implementation, the encoder module 112 may select the intra prediction mode from the most probable modes and the remaining mode candidates, when the encoder module 112 selects the first one of the reference line candidate to predict the block unit. In at least one implementation, the encoder module 112 may select the intra prediction mode only from the most probable modes, when the encoder module 112 selects the specific reference line candidates different from the first reference line candidate to predict the block unit.

In at least one implementation, the intra prediction unit 22221 selects the intra prediction mode only from the most probable modes, when the intra prediction unit 22221 selects the specific reference line candidate to reconstruct the block unit based on the reference line index. Thus, the intra prediction unit 22221 may directly determine that the intra prediction mode is included in the most probable modes each being different from the non-angular modes, when the intra prediction unit 22221 determines that the reference line index is different from the first predefined value. In other words, the intra prediction mode may be selected only from the angular modes included in the most probable modes based on a first one of a plurality of mode indices, when the intra prediction unit 22221 selects the specific reference line candidate different from the first reference line candidate to reconstruct the block unit. In at least one implementation, the prediction indications may include the mode indices. In at least one implementation, the first one of the mode indices may be an mpm index for selecting the intra prediction mode from the most probable modes. In at least one implementation, the mpm index may be a syntax element mpm_idx in HEVC. In at least one implementation, the mpm index may be a syntax element intra_luma_mpm_idx in VVC or VTM.

In at least one implementation, the intra prediction unit 22221 selects the intra prediction mode from the most probable modes and the remaining mode candidates, when the intra prediction unit 22221 selects the first reference line candidate to reconstruct the block unit based on the reference line index. Thus, the intra prediction unit 22221 may further determine whether the intra prediction mode is included in the most probable modes including the non-angular modes or the remaining mode candidates different from the non-angular modes, when the intra prediction unit 22221 determines that the reference line index is equal to the first predefined value. In one implementation, the intra prediction unit 22221 may determine the intra prediction mode based on the first one of the mode indices, when the intra prediction unit 22221 determines that the intra prediction mode is selected from the most probable modes based on one of the reference line index and a most probable mode (mpm) flag. In at least one implementation, the mpm flag may be a syntax element prev_intra_luma_pred_flag in HEVC. In at least one implementation, the mpm flag may be a syntax element intra_luma_mpm_flag in VVC or VTM. In another implementation, the intra prediction unit 22221 may determine the intra prediction mode based on a second one of the mode indices, when the intra prediction unit 22221 determines that the intra prediction mode is selected from the remaining mode candidates based on the mpm flag. In at least one implementation, the second one of the mode indices may be a non-mpm index for selecting the intra prediction mode from the remaining mode candidates. In at least one implementation, the non-mpm index may be a syntax element rem_intra_luma_pred_mode in HEVC. In at least one implementation, the non-mpm index may be a syntax element intra_luma_mpm_remainder in VVC or VTM.

In at least one implementation, the block unit may include a plurality of block elements. In the implementation, each of the block elements may be a pixel element. The intra prediction unit 22221 may select, based on the intra prediction mode, at least one of the reference line samples in the selected reference line candidates for each of the block elements. Then, the intra prediction unit 22221 may generate one of the predictors for each of the block elements.

In at least one implementation, the first summer 2224 of the decoder module 222 in the destination device 12 may add the predictors into a plurality of residual samples determined from the bitstream to reconstruct the block unit. In addition, the decoder module 222 may reconstruct all of the other block units in the image frame for reconstructing the image frame and the video.

Figure 8:
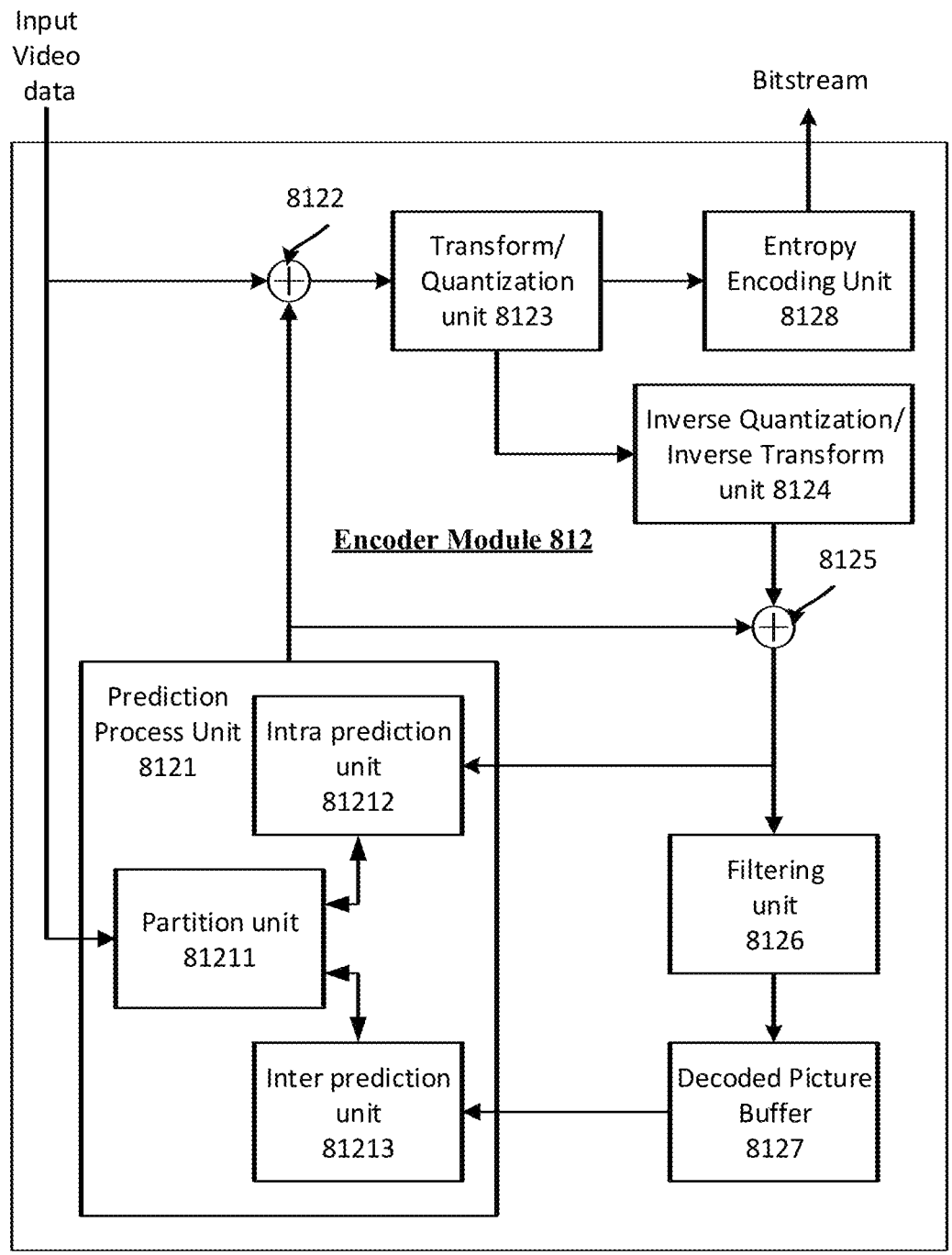
FIG. 8 is a block diagram of an example implementation of the encoder module of the source device in the system of FIG. 1.

FIG. 8 is a block diagram of an encoder module 812 representing an example implementation of the encoder module 812 of the source device 11 in the system of FIG. 1. In at least one implementation, the encoder module 812 includes a prediction processor (e.g., prediction process unit 8121), at least one summer (e.g., first summer 8122 and second summer 8125), a quantization transform processor (e.g., transform/quantization unit 8123), an inverse quantization/inverse transform processor (e.g., inverse quantization/inverse transform unit 8124), a filter (e.g., filtering unit 8126), a decoded picture buffer (e.g., decoded picture buffer 8127), and an entropy encoder (e.g., entropy encoding unit 8128). In at least one implementation, the prediction process unit 8121 of the encoder module 812 further includes a partition processor (e.g., partition unit 81211), an intra prediction unit 81212, and an inter prediction unit 81213. In at least one implementation, the encoder module 812 receives the source video, and encodes the source video to output a bitstream.

In at least one implementation, the encoder module 812 may receive a source video including a plurality of image frames, and then divide the image frames according to a coding structure. In at least one implementation, each of the image frames may be divided into at least one image block. The at least one image block may include a luminance block having a plurality of luminance samples, and at least one chrominance block having a plurality of chrominance samples. The luminance block and the at least one chrominance block may be further divided to generate macroblocks, coding tree units (CTUs), coding blocks (CBs), sub-divisions thereof, and/or another equivalent coding unit. In at least one implementation, the encoder module 812 may perform additional sub-divisions of the source video. It should be noted that the disclosure described herein are generally applicable to video coding, regardless of how the source video is partitioned prior to and/or during encoding.

In at least one implementation, during the encoding process, the prediction process unit 8121 receives a cur rent image block of a specific one of the image frames. The cur rent image block may be one of the luminance block and the at least one of the chrominance block in the specific image frame. The partition unit 81211 divides the current image block into multiple block units. The intra prediction unit 81212 may perform intra-predictive coding of a cur rent block unit relative to one or more neighboring blocks in the same frame as the cur rent block unit to provide spatial prediction. The inter prediction unit 81213 may perform inter-predictive coding of the current block unit relative to one or more blocks in one or more reference image block to provide temporal prediction.

In at least one implementation, the prediction process unit 8121 may select one of the coding results generated by the intra prediction unit 81212 and the inter prediction unit 81213 based on a mode selection method, such as a cost function. In at least one implementation, the mode selection method may be a rate-distortion optimization (RDO) process. The prediction process unit 8121 determines the selected coding result, and provides a predicted block corresponding to the selected coding result to the first summer 8122 for generating a residual block and to the second summer 8125 for reconstructing the encoded block unit. In at least one implementation, the prediction process unit 8121 may further provide syntax elements, such as motion vectors, intra-mode indicators, partition information, and other syntax information, to the entropy encoding unit 8128.

In at least one implementation, the intra prediction unit 81212 may intra-predict the cur rent block unit. In at least one implementation, the intra prediction unit 81212 may determine an intra-prediction mode directing toward reconstructed sample neighboring to the cur rent block unit to encode the current block unit. In at least one implementation, the intra prediction unit 81212 may encode the current block unit using various intra-prediction modes, and the intra prediction unit 81212 or the prediction process unit 8121 may select an appropriate intra-prediction mode from the tested modes. In at least one implementation, the intra prediction unit 81212 may encode the cur rent block unit using a cross component prediction mode to predict one of the two chroma components of the cur rent block unit based on the luma components of the current block unit. In addition, the intra prediction unit 81212 may predict a first one of the two chroma components of the current block unit based on the other of the two chroma components of the current block unit.

In at least one implementation, the inter prediction unit 81213 may inter-predict the cur rent block unit as an alternative to the intra-prediction performed by the intra prediction unit 81212, as described above. The inter prediction unit 81213 may perform a motion estimation to estimate a motion of the current block unit for generating a motion vector. The motion vector may indicate a displacement of the cur rent block unit within the current image block relative to a reference block unit within a reference image block. In at least one implementation, the inter prediction unit 81213 receives at least one reference image block stored in the decoded picture buffer 8127 and estimates the motion based on the received reference image blocks to generate the motion vector.

In at least one implementation, the first summer 8122 generates the residual block by subtracting the prediction block determined by the prediction process unit 8121 from the original current block unit. The first summer 8122 represents the component or components that perform this subtraction operation.

In at least one implementation, the transform/quantization unit 8123 applies a transform to the residual block to generate a residual transform coefficient, and then quantizes the residual transform coefficients to further reduce bit rate. In at least one implementation, the transform may be DCT, DST, AMT, MDNSST, HyGT, signal dependent transform, KLT, wavelet transform, integer transform, sub-band transform or a conceptually similar transform. In at least one implementation, the transform may convert the residual information from a pixel value domain to a transform domain, such as a frequency domain. In at least one implementation, the degree of quantization may be modified by adjusting a quantization parameter. In at least one implementation, the transform/quantization unit 8123 may perform a scan of the matrix including the quantized transform coefficients. Alternatively, the entropy encoding unit 8128 may perform the scan.

In at least one implementation, the entropy encoding unit 8128 may receive a plurality of syntax elements including quantization parameter, transform data, motion vectors, intra modes, partition information, and other syntax information, from the prediction process unit 8121, and the transform/quantization unit 8123, and entropy encodes the syntax elements into the bitstream. In at least one implementation, the entropy encoding unit 8128 entropy encodes the quantized transform coefficients. In at least one implementation, the entropy encoding unit 8128 may perform CAVLC, CABAC, SBAC, PIPE coding or another entropy coding technique to generate an encoded bitstream. In at least one implementation, the encoded bitstream may be transmitted to another device (e.g., the destination device 12) or archived for later transmission or retrieval.

In at least one implementation, the inverse quantization/inverse transform unit 8124 may apply inverse quantization and inverse transformation to reconstruct the residual block in the pixel domain for later use as a reference block. In at least one implementation, the second summer 8125 adds the reconstructed residual block to the prediction block provided from the prediction process unit 8121 to produce a reconstructed block for storage in the decoded picture buffer 8127.

In at least one implementation, the filtering unit 8126 may include a deblocking filter, a SAO filter, a bilateral filter, and/or an ALF to remove blockiness artifacts from the reconstructed block. Additional filters (in loop or post loop)

may also be used in addition to the deblocking filter, the SAO filter, the bilateral filter and the ALF. Such filters are not shown for brevity, but if desired, may filter the output of the second summer 8125.

In at least one implementation, the decoded picture buffer 8127 may be a reference picture memory that stores the reference block for use in encoding video by the encoder module 812, e.g., in intra- or inter-coding modes. The decoded picture buffer 8127 may be formed by any of a variety of memory devices, such as DRAM, including SDRAM, MRAM, RRAM), or other types of memory devices. In at least one implementation, the decoded picture buffer 8127 may be on-chip with other components of the encoder module 812, or off-chip relative to those components.

Figure 9:
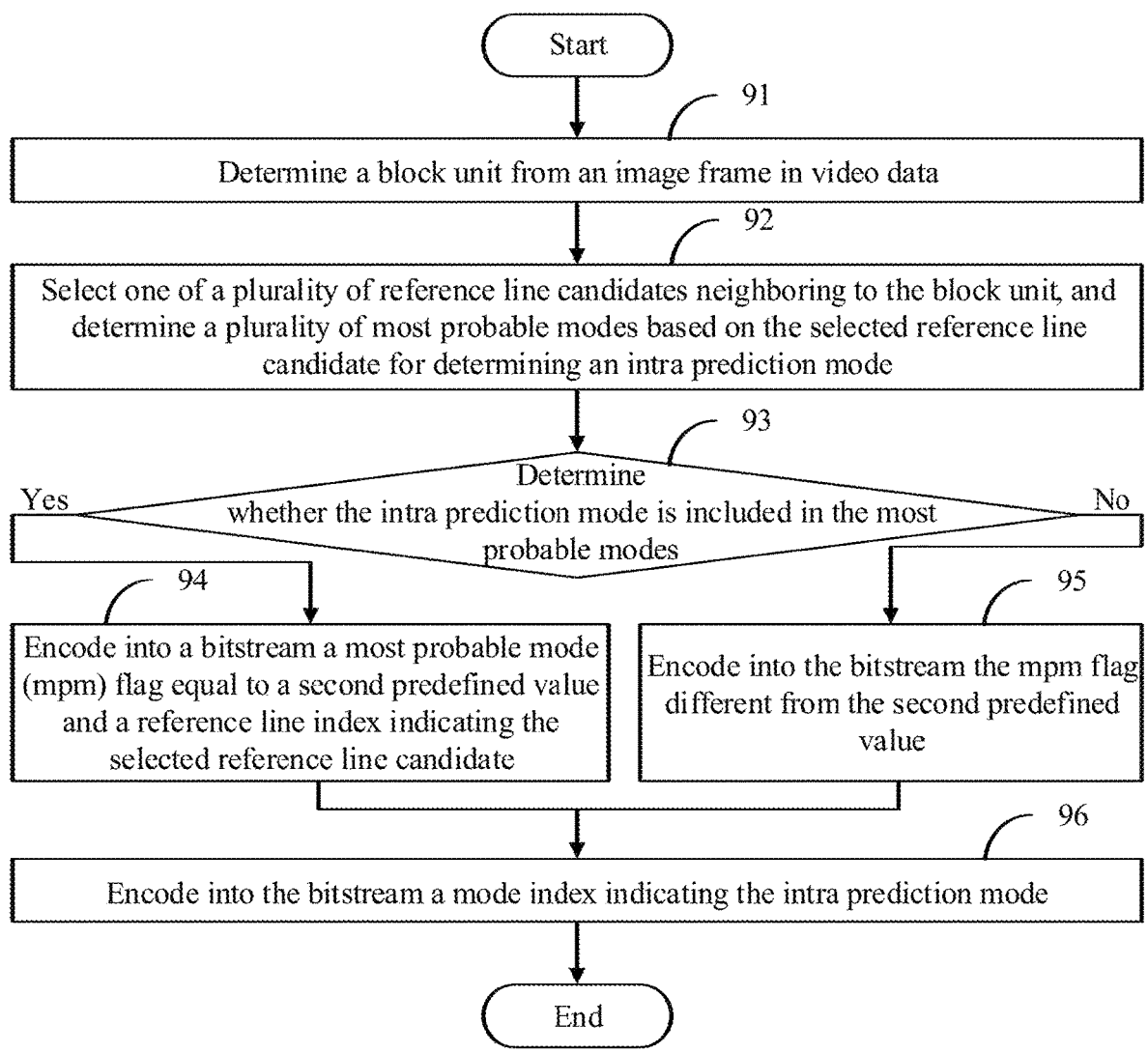
FIG. 9 illustrates a flowchart in accordance with a first example implementation of the mode signaling method for intra prediction.

FIG. 9 illustrates a flowchart in accordance with a first example implementation of the mode signaling method for intra prediction. The example method is provided by way of example only, as there are a variety of ways to carry out the method. The method described below may be carried out using the configurations illustrated in FIG. 1 and FIG. 8, for example, and various elements of these figures are referenced in explaining the example method. Each block shown in FIG. 9 represents one or more processes, methods, or subroutines, carried out in the example method. Furthermore, the order of blocks is illustrative only and may change. Additional blocks may be added or less blocks may be utilized without departing from this disclosure.

At block 91, the encoder module 812 determines a block unit in an image frame from video data.

In at least one implementation, the video data may be a video. The source device 11 may receive the video by the source module 111. The encoder module 812 determines the image frame from the video, and divides the image frame to determine the block unit.

In at least one implementation, the prediction process unit 8121 of the source device 11 determines the block unit from the video via the partition unit 81211, and then the encoder module 812 provides a plurality of partition indications into a bitstream based on a partition result of the partition unit 81211.

In at least one implementation, the prediction process unit 8121 of the source device 11 determines the neighboring blocks neighboring with the block unit. In at least one implementation, the neighboring blocks may be predicted prior to predicting the block unit, so the neighboring blocks may include a plurality of reference line samples for predicting the block unit. In at least one implementation, the block unit may be predicted prior to predicting some of the neighboring blocks, so the unpredicted neighboring blocks may not include the reference line samples for the block unit.

At block 92, the intra prediction unit 81212 selects one of a plurality of reference line candidates neighboring to the block unit, and determines a plurality of most probable modes based on the selected reference line candidate for determining an intra prediction mode.

In at least one implementation, each of the reference line candidates includes a plurality of candidate line samples. In at least one implementation, the encoder module 812 may select one of the reference line candidates for predicting the block unit, and provide a reference line index indicating the selected reference line candidate to the destination device 12. FIG. 4 is a schematic illustration of an example implementation of the block unit 41, and the reference line candidates 420-423 neighboring with the block unit 41. In at least one implementation, the intra prediction unit 81212 may select one of the reference line candidates 420-423 each having the candidate line samples for predicting the block unit 41.

In at least one implementation, the intra prediction unit 81212 may select the intra prediction mode from a plurality of intra mode candidates to predict the block unit. In at least one implementation, the intra mode candidates may include a plurality of non-angular modes and a plurality of angular modes. In the implementation, the non-angular modes may include a Planar mode and a DC mode.

In at least one implementation, the intra prediction unit 81212 may determine a plurality of most probable modes from the intra mode candidates based on the neighboring blocks neighboring to the block unit. In at least one implementation, a specific one of the intra mode candidates may be set as one of the most probable modes for the block unit, when the encoder module 812 reconstructs a specific one of the neighboring blocks according to the specific intra mode candidate. In addition, the intra prediction unit 81212 may derive the other of the most probable modes based on the specific intra mode candidate. In the implementation, all of the unselected mode candidates may be regarded as a plurality of remaining mode candidates. In at least one implementation, each of the non-angular modes may be added into the most probable modes, when the intra prediction unit 81212 selects the first one of the reference line candidate to predict the block unit. In other words, the non-angular modes may be excluded from the remaining mode candidates, when the intra prediction unit 81212 selects the first one of the reference line candidate to predict the block unit. In at least one implementation, the non-angular modes may be excluded from the most probable modes, when the intra prediction unit 81212 selects a specific one of the reference line candidates different from the first reference line candidate to predict the block unit.

In at least one implementation, the prediction process unit 8121 may select one of coding results generated according to the intra mode candidates and the reference line candidates by the intra prediction unit 81212 based on a mode selection method, such as a cost function. In at least one implementation, the mode selection method may be a rate-distortion optimization (RDO) process. In the implementation, the selected intra mode candidates used to generate the selected one of the coding results according to the selected reference line candidate may be set as the intra prediction mode by the intra prediction unit 81212.

At block 93, the intra prediction unit 81212 determines whether the intra prediction mode is included in the most probable modes. In at least one implementation, the procedure proceeds to block 94, when the intra prediction mode is included in the most probable modes. In at least one implementation, the procedure proceeds to block 95, when each of the most probable modes is different from the intra prediction mode.

In at least one implementation, the intra prediction unit 81212 may select the intra prediction mode from the most probable modes and the remaining mode candidates, when the intra prediction unit 81212 selects the first one of the reference line candidate to predict the block unit. In at least one implementation, the intra prediction unit 81212 may select the intra prediction mode only from the most probable modes, when the intra prediction unit 81212 selects the specific reference line candidate different from the first reference line candidate to predict the block unit.

In one implementation, each of the reference line candidates may be selectable for the block unit, when the intra prediction mode is included in the most probable modes.

Thus, the encoder module 812 may encode, into a bitstream, a most probable mode (mpm) flag to indicate that the intra prediction mode is included in the most probable modes, and a reference line index indicating the selected reference line candidate. In another implementation, the specific reference line candidates different from the first reference line candidate may be excluded from the selectable reference line candidates for the block unit, when the intra prediction mode is not included in the most probable modes. Thus, the encoder module 812 may not encode the reference line index into the bitstream, since the encoder module 812 may directly set the first reference line candidate as the selected reference line candidate when the intra prediction mode is not included in the most probable modes. In addition, the encoder module 812 may encode, into a bitstream, the mpm flag to indicate that the intra prediction mode is not included in the most probable modes.

At block 94, the encoder module 812 encodes into the bitstream the mpm flag equal to a second predefined value and the reference line index indicating the selected reference line candidate.

In at least one implementation, the encoder module 812 may set the mpm flag be equal to the second predefined value, when the encoder module 812 selects the intra prediction mode from the most probable modes. In at least one implementation, the mpm flag may be a syntax element prev_intra_luma_pred_flag in HEVC. In at least one implementation, the mpm flag may be a syntax element intra_luma_mpm_flag in VVC or VTM. In at least one implementation, the second predefined value may be equal to one. In addition, the encoder module 812 may encode the reference line index indicating the selected reference line candidate.

At block 95, the encoder module 812 encodes into the bitstream the mpm flag different from the second predefined value.

In at least one implementation, the encoder module 812 may set the mpm flag be different from the second predefined value, when the encoder module 812 selects the intra prediction mode from the remaining mode candidates. In the implementation, the encoder module 812 may encode the video without signaling the reference line index, when the intra prediction mode is not included in the most probable modes.

At block 96, the encoder module 812 encodes into the bitstream a mode index indicating the intra prediction mode.

In at least one implementation, the mode index may be an mpm index for selecting the intra prediction mode from the most probable modes. In at least one implementation, the mpm index may be a syntax element mpm_idx in HEVC. In at least one implementation, the mpm index may be a syntax element intra_luma_mpm_idx in VVC or VTM. In at least one implementation, the mode index may be a non-mpm index for selecting the intra prediction mode from the remaining mode candidates. In at least one implementation, the non-mpm index may be a syntax element rem_intra_luma_pred_mode in HEVC. In at least one implementation, the non-mpm index may be a syntax element intra_luma_mpm_remainder in VVC or VTM.

Figure 10:
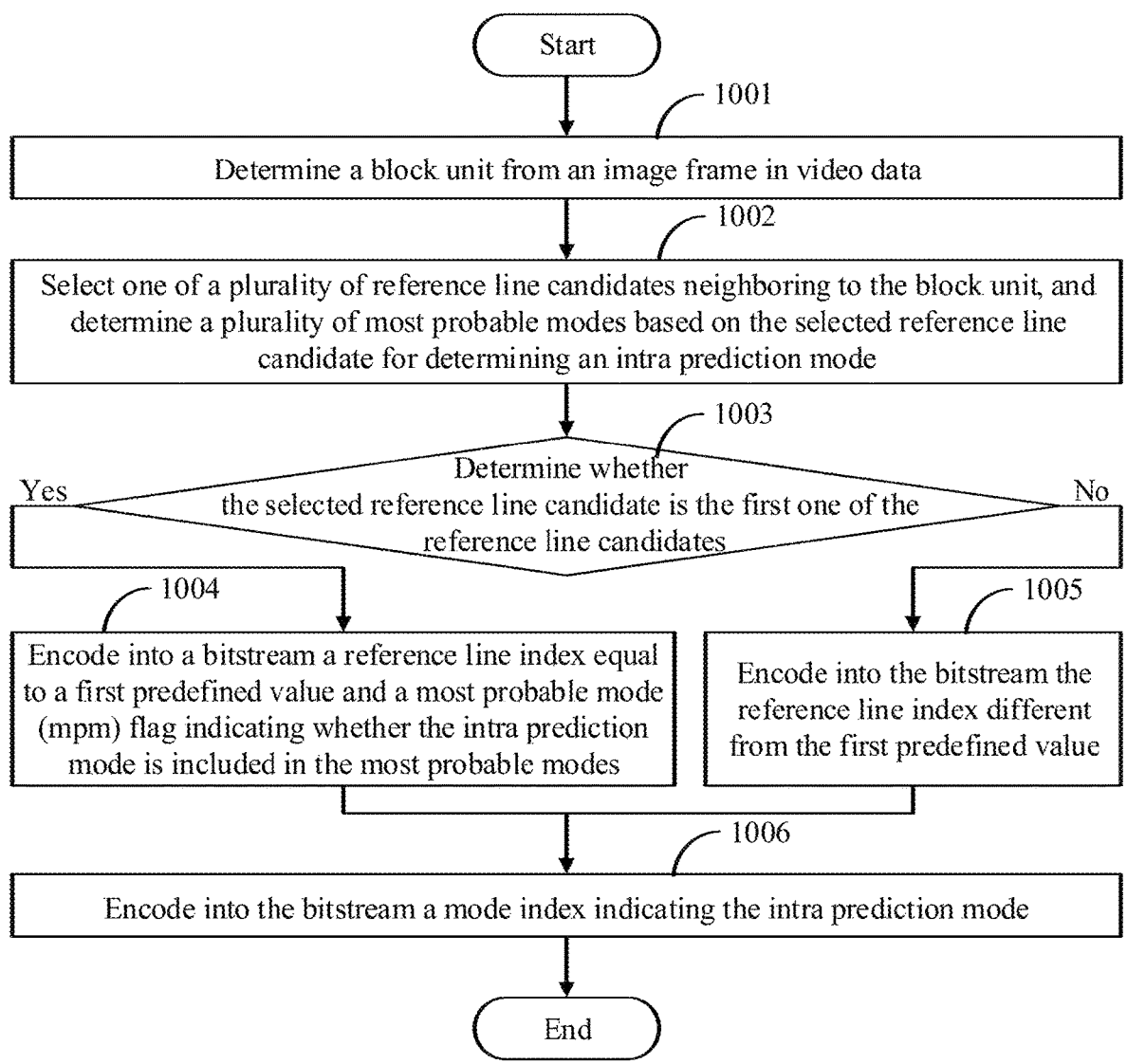
FIG. 10 illustrates a flowchart in accordance with a second example implementation of the mode signaling method for intra prediction.

FIG. 10 illustrates a flowchart in accordance with a second example implementation of the mode signaling method for intra prediction. The example method is provided by way of example only, as there are a variety of ways to carry out the method. The method described below may be carried out using the configurations illustrated in FIG. 1 and FIG. 8, for example, and various elements of these figures are referenced in explaining the example method. Each block shown in FIG. 10 represents one or more processes, methods, or subroutines, carried out in the example method. Furthermore, the order of blocks is illustrative only and may change. Additional blocks may be added or less blocks may be utilized without departing from this disclosure.

At block 1001, the encoder module 812 determines a block unit in an image frame from video data. In at least one implementation, the determination method at block 1001 is substantially identical to that at block 91.

At block 1002, the intra prediction unit 81212 selects one of a plurality of reference line candidates neighboring to the block unit, and determines a plurality of most probable modes based on the selected reference line candidate for determining an intra prediction mode. In at least one implementation, the selection method and the determination method at block 1002 are identical to those at block 92.

At block 1003, the intra prediction unit 81212 determines whether the selected reference line candidate is the first one of the reference line candidates. In at least one implementation, the procedure proceeds to block 1004, when the selected reference line candidate is the first one of the reference line candidates. In at least one implementation, the procedure proceeds to block 1005, when the selected reference line candidate is a specific one of the reference line candidates different from the first reference line candidates.

In at least one implementation, the intra prediction unit 81212 may select the intra prediction mode from a plurality of intra mode candidates including the most probable modes, when the intra prediction unit 81212 selects the first one of the reference line candidate to predict the block unit. In the implementation, the encoder module 812 may encode, into the bitstream, a reference line index equal to a first predefined value and a most probable mode (mpm) flag indicating whether the intra prediction mode is included in the most probable modes or a plurality of remaining mode candidates. In the implementation, the remaining mode candidates are generated by removing the most probable modes from the intra mode candidates.

In at least one implementation, the intra prediction unit 81212 may select the intra prediction mode only from the most probable modes, when the intra prediction unit 81212 selects the specific reference line candidate different from the first reference line candidate to predict the block unit. Thus, the encoder module 812 may encode, into the bitstream, the reference line index different from the first predefined value, when the encoder module 812 determine that the selected reference line candidate is different from the first reference line candidate. In addition, the encoder module 812 may not encode the mpm flag into the bitstream, since the decoder module 222 may directly determine that the intra prediction mode is included in the most probable modes when the selected reference line candidate is different from the first one of the reference line candidates.

At block 1004, the encoder module 812 encodes into the bitstream the reference line index equal to a first predefined value and the mpm flag indicating whether the intra prediction mode is included in the most probable modes.

In at least one implementation, the encoder module 812 may set the reference line index equal to the first predefined value, when the encoder module 812 selects the first reference line candidate to predict the block unit. In at least one implementation, the reference line index may be a syntax element intra_luma_ref_idx in VVC or VTM. In at least one implementation, the first predefined value is equal to zero. In addition, the encoder module may encode the mpm flag for indicating whether the intra prediction mode is included in the most probable modes.

At block 1005, the encoder module 812 encodes into the bitstream the reference line index different from a first predefined value.

In at least one implementation, the encoder module 812 may set the reference line index different from the first predefined value, when the selected reference line candidate is different from the first reference line candidate. Thus, the encoder module 812 may encode the video without signaling the mpm flag for the block unit, when the block unit is predicted based on the specific reference line candidate different from the first reference line candidate.

At block 1006, the encoder module 812 encodes into the bitstream a mode index indicating the intra prediction mode.

In at least one implementation, the mode index may be an mpm index for selecting the intra prediction mode from the most probable modes. In at least one implementation, the mode index may be a non-mpm index for selecting the intra prediction mode from the remaining mode candidates. In at least one implementation, in HEVC, the mpm index may be a syntax element mpm_idx, and the non-mpm index may be a syntax element rem_intra_luma_pred_mode. In at least one implementation, in VVC or VTM, the mpm index may be a syntax element intra_luma_mpm_idx, and the non-mpm index may be a syntax element intra_luma_mpm_remainder.

From the above description, it is manifest that various techniques may be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of decoding a bitstream by an electronic device, the method comprising:
   determining a block unit having an intra prediction mode from an image frame according to the bitstream;
   determining, based on at least one of a reference line index and a most probable mode (mpm) flag, one of a plurality of mode indices that is indicative of the intra prediction mode of the block unit;
   determining the intra prediction mode of the block unit based on a first one of the plurality of mode indices, when the reference line index is different from a first predefined value, wherein the first one of the plurality of mode indices is an mpm index, the first predefined value indicates a first one of a plurality of reference line candidates and the first one of the plurality of reference line candidates is immediately adjacent to the block unit;
   determining the intra prediction mode of the block unit based on the mpm index, when the reference line index is equal to the first predefined value and the mpm flag is equal to a second predefined value; and
   reconstructing the block unit of the image frame based on the intra prediction mode, wherein:
   the intra prediction mode is selected from a plurality of most probable modes when the intra prediction mode is determined based on the mpm index,
   the plurality of most probable modes is derived according to the reference line index,
   a Planar mode is included in the plurality of most probable modes when the reference line index is equal to the first predefined value, and
   the Planar mode is excluded from the plurality of most probable modes when the reference line index is different from the first predefined value.

2. The method according to claim 1, wherein the reference line index is determined for selecting one of the plurality of reference line candidates to reconstruct the block unit.

3. The method according to claim 2, further comprising:
   determining the mpm flag of the block unit according to the bitstream;
   determining the reference line index of the block unit according to the bitstream, when the mpm flag is equal to the second predefined value; and
   determining, without parsing the reference line index, that the selected one of the plurality of reference line candidates is the first one of the plurality of reference line candidates, when the mpm flag is different from to the second predefined value.

4. The method according to claim 1, wherein the plurality of most probable modes is derived from a plurality of intra mode candidates including the Planar mode, a DC mode and a plurality of angular modes.

5. The method according to claim 4, further comprising:
   determining the intra prediction mode from a plurality of remaining prediction modes generated by removing the plurality of most probable modes from the plurality of intra mode candidates, when the mpm flag is different from the second predefined value.

6. The method according to claim 1, further comprising:
   determining the reference line index of the block unit according to the bitstream;
   determining the mpm flag of the block unit for determining the one of the plurality of mode indices that is indicative of the intra prediction mode of the block unit, when the reference line index is equal to the first predefined value; and
   determining, without parsing the mpm flag, that the intra prediction mode is determined based on the mpm index, when the reference line index is different from the first predefined value.

7. An electronic device for decoding a bitstream, the electronic device comprising:
   at least one processor; and
   a storage device coupled to the at least one processor and storing a plurality of instructions which, when executed by the at least one processor, causes the at least one processor to:
   determine a block unit having an intra prediction mode from the image frame according to bitstream;
   determine, based on at least one of a reference line index and a most probable mode (mpm) flag, one of a plurality of mode indices that is indicative of the intra prediction mode of the block unit;
   determine the intra prediction mode of the block unit based on a first one of the plurality of mode indices, when the reference line index is different from a first predefined value, wherein the first one of the plurality of mode indices is an mpm index, the first predefined value indicates a first one of a plurality of reference line candidates and the first one of the plurality of reference line candidates is immediately adjacent to the block unit;

determine the intra prediction mode of the block unit based on the mpm index, when the reference line index is equal to the first predefined value and the mpm flag is equal to a second predefined value; and reconstruct the block unit of the image frame based on the intra prediction mode, wherein:

the intra prediction mode is selected from a plurality of most probable modes when the intra prediction mode is determined based on the mpm index, the plurality of most probable modes is derived according to the reference line index, a Planar mode is included in the plurality of most probable modes when the reference line index is equal to the first predefined value, and the Planar mode is excluded from the plurality of most probable modes when the reference line index is different from the first predefined value.

8. The electronic device according to claim 7, wherein the reference line index is determined for selecting one of the plurality of reference line candidates to reconstruct the block unit.

9. The electronic device according to claim 8, wherein the plurality of instructions, when executed by the at least one processor, further causes the at least one processor to:

determine the mpm flag of the block unit according to the bitstream;

determine the reference line index of the block unit according to the bitstream, when the mpm flag is equal to the second predefined value; and determine, without parsing the reference line index, that the selected one of the plurality of reference line candidates is the first one of the plurality of reference line candidates, when the mpm flag is different from to the second predefined value.

10. The electronic device according to claim 7, wherein the plurality of most probable modes is selected from a plurality of intra mode candidates including the Planar mode, a DC mode and a plurality of angular modes.

11. The electronic device according to claim 10, wherein the intra prediction mode is selected from a plurality of remaining prediction modes generated by removing the plurality of most probable modes from the plurality of intra mode candidates, when the mpm flag is different from the second predefined value.

12. The electronic device according to claim 7, wherein the plurality of instructions, when executed by the at least one processor, further causes the at least one processor to:

determine the reference line index of the block unit according to the bitstream;

determine the mpm flag of the block unit for determining the one of the plurality of mode indices that is indicative of the intra prediction mode of the block unit, when the reference line index is equal to the first predefined value; and determining, without parsing the mpm flag, that the intra prediction mode is determined based on the mpm index, when the reference line index is different from the first predefined value.

13. A method of decoding a bitstream by an electronic device, the method comprising:

determining a block unit having an intra prediction mode from an image frame according to the bitstream, wherein the intra prediction mode is selected from a plurality of intra mode candidates;

determining a reference line index of the block unit according to the bitstream;

determining a most probable mode (mpm) flag of the block unit after the reference line index is determined to be equal to a first predefined value, wherein the first predefined value indicates a first one of a plurality of reference line candidates and the first one of the plurality of reference line candidates is immediately adjacent to the block unit;

determining the intra prediction mode from a plurality of most probable modes, when the mpm flag is equal to a second predefined value, wherein:

the plurality of most probable modes is derived based on the reference line index, a Planar mode is included in the plurality of most probable modes when the reference line index is equal to the first predefined value, and the Planar mode is excluded from the plurality of most probable modes when the reference line index is different from the first predefined value;

determining the intra prediction mode from a plurality of remaining prediction modes generated by removing the plurality of most probable modes from the plurality of intra mode candidates, when the mpm flag is different from the second predefined value; and reconstructing the block unit of the image frame based on the intra prediction mode.

14. The method according to claim 13, wherein the reference line index is determined for selecting one of the plurality of reference line candidates to reconstruct the block unit.

15. The method according to claim 13, further comprising:

determining, without parsing the mpm flag, that the intra prediction mode is selected from the plurality of most probable modes, when the reference line index is different from the first predefined value.

16. The method according to claim 13, wherein the plurality of most probable modes is selected from the plurality of intra mode candidates including the Planar mode, a DC mode and a plurality of angular modes.

* * * * *